(12) United States Patent
ElShafie et al.

(10) Patent No.: US 12,543,114 B2
(45) Date of Patent: Feb. 3, 2026

(54) CELL WAKE-UP SIGNAL TRIGGERING AND RESOURCE SELECTION

(71) Applicant: QUALCOMM Incorporated, San Diego, CA (US)

(72) Inventors: Ahmed ElShafie, San Diego, CA (US); Diana Maamari, San Diego, CA (US); Marwen Zorgui, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 388 days.

(21) Appl. No.: 18/186,714

(22) Filed: Mar. 20, 2023

(65) Prior Publication Data

US 2024/0323842 A1 Sep. 26, 2024

(51) Int. Cl.
*H04W 52/02* (2009.01)
*H04W 72/02* (2009.01)

(52) U.S. Cl.
CPC ....... *H04W 52/0229* (2013.01); *H04W 72/02* (2013.01)

(58) Field of Classification Search
CPC ......... H04W 52/0229; H04W 52/0216; H04W 52/0235; H04W 72/02; H04W 76/28
See application file for complete search history.

(56) References Cited

U.S. PATENT DOCUMENTS

| | | | |
|---|---|---|---|
| 2014/0011543 A1* | 1/2014 | Li | H04W 52/0206 455/561 |
| 2023/0337033 A1* | 10/2023 | Hu | H04W 52/0229 |
| 2024/0155490 A1* | 5/2024 | Khlass | H04W 52/0229 |
| 2025/0024374 A1* | 1/2025 | Höglund | H04W 52/0219 |
| 2025/0039728 A1* | 1/2025 | Martin | H04W 52/0235 |
| 2025/0048435 A1* | 2/2025 | Yan | H04W 52/0235 |
| 2025/0071680 A1* | 2/2025 | Zhou | H04W 72/232 |
| 2025/0113300 A1* | 4/2025 | Cheng | H04W 52/0245 |
| 2025/0133493 A1* | 4/2025 | Jiang | H04W 52/02 |

* cited by examiner

*Primary Examiner* — Robert C Scheibel
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may receive, cell wake-up signal (C-WUS) configuration information indicating C-WUS resources configured for one or more C-WUS monitoring occasions. The UE may detect whether a C-WUS triggering condition is satisfied. The UE, in connection with the C-WUS condition being satisfied, may transmit a C-WUS via at least one C-WUS resource, selected from the C-WUS resources configured for a C-WUS monitoring occasion. The at least one C-WUS resource may be associated with a C-WUS resource selection parameter. Particular aspects of the subject matter described herein can be implemented to realize one or more of the following potential advantages. In some examples, the described techniques can be used to increase network energy efficiency and network power savings.

30 Claims, 11 Drawing Sheets

CELL WAKE-UP SIGNAL TRIGGERING AND RESOURCE SELECTION

FIELD OF THE DISCLOSURE

Aspects of the present disclosure generally relate to wireless communication and specifically, to techniques and apparatuses for cell wake-up signal (C-WUS) triggering and resource selection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

For various reasons, including climate change mitigation, environmental sustainability, and network cost reduction, network energy saving and/or network energy efficiency measures are expected to have increased importance in wireless network operations. For example, although NR generally offers a significant energy efficiency improvement per gigabyte over previous generations (for example, LTE), new NR use cases and/or the adoption of millimeter wave frequencies may require more network sites, more network antennas, larger bandwidths, and/or more frequency bands, which could potentially lead to more efficient wireless networks that nonetheless have higher energy requirements and/or cause more emissions than previous wireless network generations. Furthermore, energy accounts for a significant proportion of the cost to operate a wireless network. For example, according to some estimates, energy costs are about one-fourth the total cost to operate a wireless network. The largest proportion of energy consumption and/or energy costs are associated with a radio access network (RAN), which accounts for about half of the energy consumption in a wireless network, with data centers and fiber transport accounting for smaller shares. Accordingly, measures to increase network energy savings and/or improve network energy efficiency are important factors that may drive adoption and/or expansion of wireless networks.

SUMMARY

Some aspects described herein relate to a user equipment (UE) for wireless communication. The UE may include at least one memory and at least one processor communicatively coupled with the at least one memory. The at least one processor may be operable to cause the UE to receive, from a network node, cell wake-up signal (C-WUS) configuration information indicating respective C-WUS resources associated with each of one or more C-WUS monitoring occasions. The at least one processor may be operable to cause the UE to transmit, to the network node and in connection with a C-WUS triggering condition being satisfied, a C-WUS via one or more C-WUS resources of the respective C-WUS resources associated with a C-WUS monitoring occasion of the one or more C-WUS monitoring occasions, the one or more C-WUS resources being associated with a C-WUS resource selection parameter.

Some aspects described herein relate to a network node for wireless communication. The network node may include at least one memory and at least one processor communicatively coupled with the at least one memory. The at least one processor may be operable to cause the network node to transmit C-WUS configuration information indicating respective C-WUS resources associated with each of one or more C-WUS monitoring occasions. The at least one processor may be operable to cause the network node to receive, in connection with a C-WUS triggering condition being satisfied at a UE, a C-WUS via one or more C-WUS resources of the respective resources associated with a C-WUS monitoring occasion of the one or more C-WUS monitoring occasions, the one or more C-WUS resources being associated with a C-WUS resource selection parameter.

Some aspects described herein relate to a method of wireless communication performed by a UE. The method may include receiving, from a network node, C-WUS configuration information indicating respective C-WUS resources associated with each of one or more C-WUS monitoring occasions. The method may include transmitting, to the network node and in connection with a C-WUS triggering condition being satisfied, a C-WUS via one or more C-WUS resources of the respective C-WUS resources associated with a C-WUS monitoring occasion of the one or more C-WUS monitoring occasions, the one or more C-WUS resources being associated with a C-WUS resource selection parameter.

Some aspects described herein relate to a method of wireless communication performed by a network node. The method may include transmitting C-WUS configuration information indicating respective C-WUS resources associated with each of one or more C-WUS monitoring occasions. The method may include receiving, in connection with a C-WUS triggering condition being satisfied at a UE, a C-WUS via one or more C-WUS resources of the respective resources associated with a C-WUS monitoring occasion of the one or more C-WUS monitoring occasions, the one or more C-WUS resources being associated with a C-WUS resource selection parameter.

Some aspects described herein relate to a non-transitory computer-readable medium that stores a set of instructions for wireless communication by a UE. The set of instructions, when executed by one or more processors of the UE, may cause the UE to receive, from a network node, C-WUS configuration information indicating respective C-WUS resources associated with each of one or more C-WUS monitoring occasions. The set of instructions, when executed by one or more processors of the UE, may cause the UE to transmit, to the network node and in connection with a C-WUS triggering condition being satisfied, a C-WUS via one or more C-WUS resources of the respective C-WUS resources associated with a C-WUS monitoring occasion of the one or more C-WUS monitoring occasions, the one or more C-WUS resources being associated with a C-WUS resource selection parameter.

Some aspects described herein relate to a non-transitory computer-readable medium that stores a set of instructions for wireless communication by a network node. The set of instructions, when executed by one or more processors of the network node, may cause the network node to transmit C-WUS configuration information indicating respective C-WUS resources associated with each of one or more C-WUS monitoring occasions. The set of instructions, when executed by one or more processors of the network node, may cause the network node to receive, in connection with a C-WUS triggering condition being satisfied at a UE, a C-WUS via one or more C-WUS resources of the respective resources associated with a C-WUS monitoring occasion of the one or more C-WUS monitoring occasions, the one or more C-WUS resources being associated with a C-WUS resource selection parameter.

Some aspects described herein relate to an apparatus for wireless communication. The apparatus may include means for receiving, from a network node, C-WUS configuration information indicating respective C-WUS resources associated with each of one or more C-WUS monitoring occasions. The apparatus may include means for transmitting, to the network node and in connection with a C-WUS triggering condition being satisfied, a C-WUS via one or more C-WUS resources of the respective C-WUS resources associated with a C-WUS monitoring occasion of the one or more C-WUS monitoring occasions, the one or more C-WUS resources being associated with a C-WUS resource selection parameter.

Some aspects described herein relate to an apparatus for wireless communication. The apparatus may include means for transmitting C-WUS configuration information indicating respective C-WUS resources associated with each of one or more C-WUS monitoring occasions. The apparatus may include means for receiving, in connection with a C-WUS triggering condition being satisfied at a UE, a C-WUS via one or more C-WUS resources of the respective resources associated with a C-WUS monitoring occasion of the one or more C-WUS monitoring occasions, the one or more C-WUS resources being associated with a C-WUS resource selection parameter.

Aspects generally include a method, apparatus, system, computer program product, non-transitory computer-readable medium, UE, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
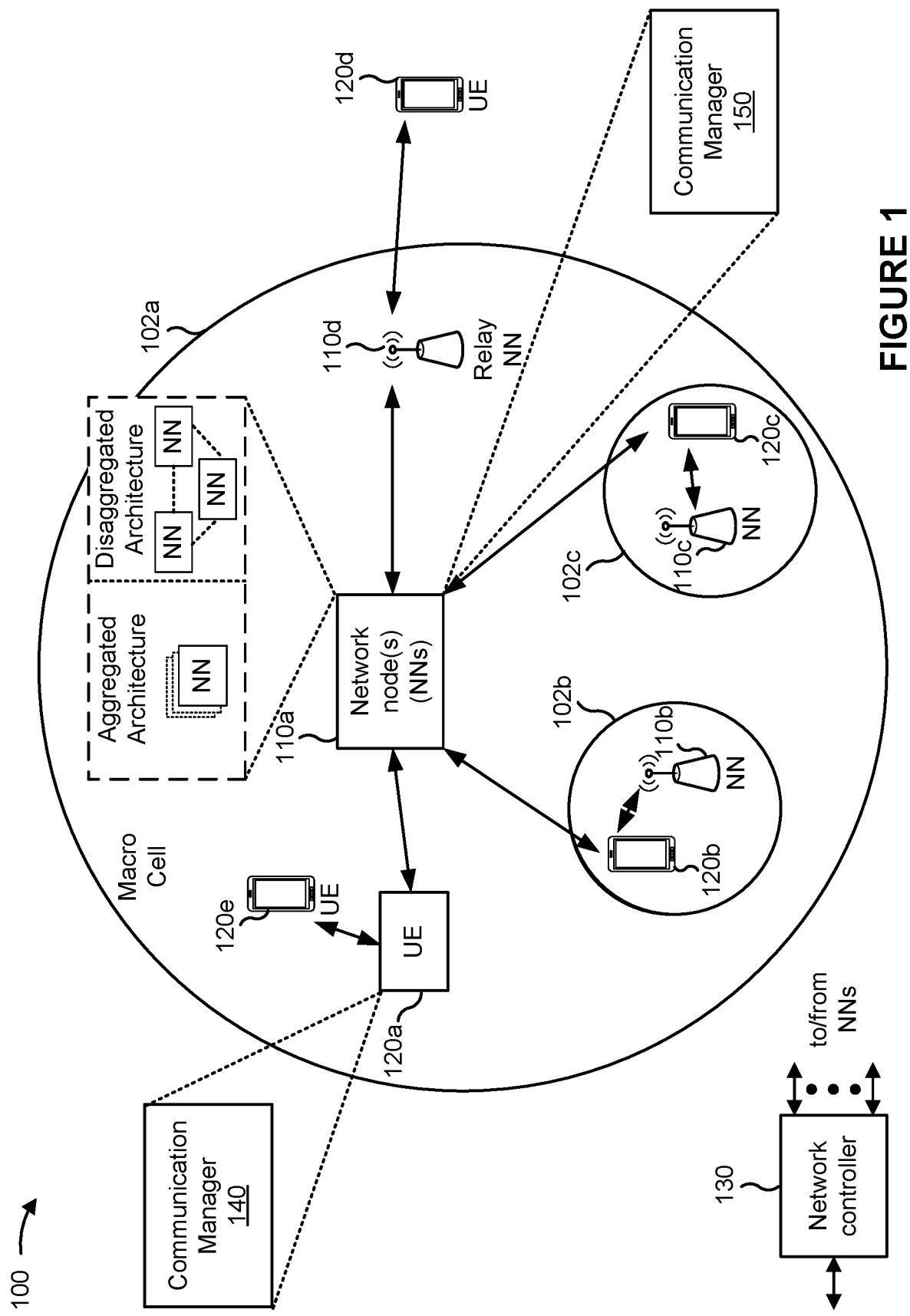
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to cell wake-up signal (C-WUS) triggering and resource selection. Some aspects more specifically relate to a triggering condition for triggering transmission, by a user equipment (UE), of a C-WUS to activate a network node from an inactive or sleep state, and selection, by the UE, of one or more resources for transmitting the C-WUS. In some aspects, a network node may transmit, and a UE may receive, C-WUS configuration information indicating C-WUS resources configured for one or more C-WUS monitoring occasions. The UE may detect whether a C-WUS triggering condition is satisfied. The UE, in connection with the C-WUS condition being satisfied, may select at least one C-WUS resource, from the C-WUS resources configured for a C-WUS monitoring occasion, based on or otherwise associated with a C-WUS resource selection parameter, and transmit a C-WUS to the network node via the selected at least one C-WUS resource. In some examples, the C-WUS triggering condition may be associated with a condition in addition to the availability or arrival of uplink data in an uplink buffer that triggers a scheduling request (SR) or buffer status request (BSR) at the UE. For example, the C-WUS triggering condition may be based on or otherwise associated with an uplink buffer size of the UE, an uplink latency experienced at the UE, a drop in a measured downlink reference signal received power (RSRP) at the UE, an energy level of the UE, a discharging rate of the UE, or a charging rate of the UE. In some examples, the UE may select a resource block (RB) from a set of RBs configured for a C-WUS monitoring occasion based on or otherwise in association with the C-WUS resource selection parameter. In some examples, the resource selection parameter may be a configured scrambling identifier (ID), a cell-specific sequence, a UE ID, a UE group ID, a latest synchronization signal block (SSB) index or channel state information (CSI) reference signal (CSI-RS) index indicated by the UE to the network node, an SSB index selected by the UE, or an index of a reference signal associated with a wake-up radio (WUR) of the UE. In some examples, the resource selection parameter may be associated with a class or type of the UE, a class or type of a WUR of the UE, a class or type of a main radio (MR) of the UE, or a network energy state (NES) of the network node. In some examples, the C-WUS configuration information may configure resources and/or uplink transmission parameters that enable the UE to transmit additional information bits with the C-WUS in a C-WUS monitoring occasion. In some examples, the C-WUS configuration information may configure different C-WUS configurations associated with different NESs of the network node. For example, the different C-WUS configurations may indicate different quantities of C-WUS monitoring and/or different quantities of configured C-WUS resources associated with different NESs.

Particular aspects of the subject matter described in this disclosure can be implemented to realize one or more of the following potential advantages. In some examples, the described techniques can be used to increase network energy efficiency and network power savings associated with a cell discontinuous reception (DRX) mode. In some examples, the transmission of the C-WUS responsive to, based on, or otherwise associated with detecting that the C-WUS triggering condition is satisfied may result in a decreased frequency of C-WUS transmissions, thus resulting in reduced time durations in which the network node operates in the active state and increased network power savings. In some examples, the C-WUS triggering condition being based on or otherwise associated with the uplink latency at the UE may result in increased network energy savings without adversely affecting the latency of latency sensitive uplink traffic. In some examples, the C-WUS triggering condition being based on or otherwise associated with a drop in measured downlink RSRP may aid the network in a decision of whether to increase a density of SSBs transmitted by the network node, and may also result in decreased radio link failure (RLF) at the UE. In some examples, the C-WUS triggering condition being based on or otherwise associated with the discharging rate of the UE may result in the UE being served more quickly in instances in which a power consumption of the UE is high, which may result in reduced power consumption by the UE. In some examples, the selection of the at least one C-WUS resource based on or otherwise associated with the resource selection parameter may enable the selected at least one C-WUS resource to indicate additional information, such as an SSB index, to the network node, which may result in decreased signaling overhead between the UE and the network node once the network node receives the C-WUS and switches to an active state. In some examples, the techniques described herein in which the UE is enabled to transmit additional information bits together with the C-WUS may enable the UE to provide additional information to the network node, which may result in decreased signaling overhead between the UE and the network node once the network node receives the C-WUS and switches to an active state. In some examples, the C-WUS configuration information indicating different C-WUS configurations associated with different NESs may result in decreased C-WUS monitoring occasions for a lower energy NES, which may increase network power savings while the network node is operating in the lower energy NES.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, and/or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), and/or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHZ-7.125 GHz) and FR2 (24.25 GHz-52.6 GHz). Although a portion of FR1 is greater than 6 GHZ, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHZ), FR4 (52.6 GHZ-114.25 GHZ), and FR5 (114.25 GHZ-300 GHz). Each of these higher frequency bands falls within the EHF band.

With the above examples in mind, unless specifically stated otherwise, the term "sub-6 GHZ," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive, from a network node, C-WUS configuration information indicating respective C-WUS resources associated with each of one or more C-WUS monitoring occasions; and transmit, to the network node and in connection with a C-WUS triggering condition being satisfied, a C-WUS via one or more C-WUS resources of the respective C-WUS resources associated with a C-WUS monitoring occasion of the one or more C-WUS monitoring occasions, the one or more C-WUS resources being associated with a C-WUS resource selection parameter. Additionally, or alternatively, the communication manager 140 may perform one or more other operations described herein.

In some aspects, the network node 110 may include a communication manager 150. As described in more detail elsewhere herein, the communication manager 150 may transmit C-WUS configuration information indicating respective C-WUS resources associated with each of one or more C-WUS monitoring occasions; and receive, in connection with a C-WUS triggering condition being satisfied at a UE, a C-WUS via one or more C-WUS resources of the respective resources associated with a C-WUS monitoring occasion of the one or more C-WUS monitoring occasions, the one or more C-WUS resources being associated with a C-WUS resource selection parameter. Additionally, or alternatively, the communication manager 150 may perform one or more other operations described herein.

Figure 2:
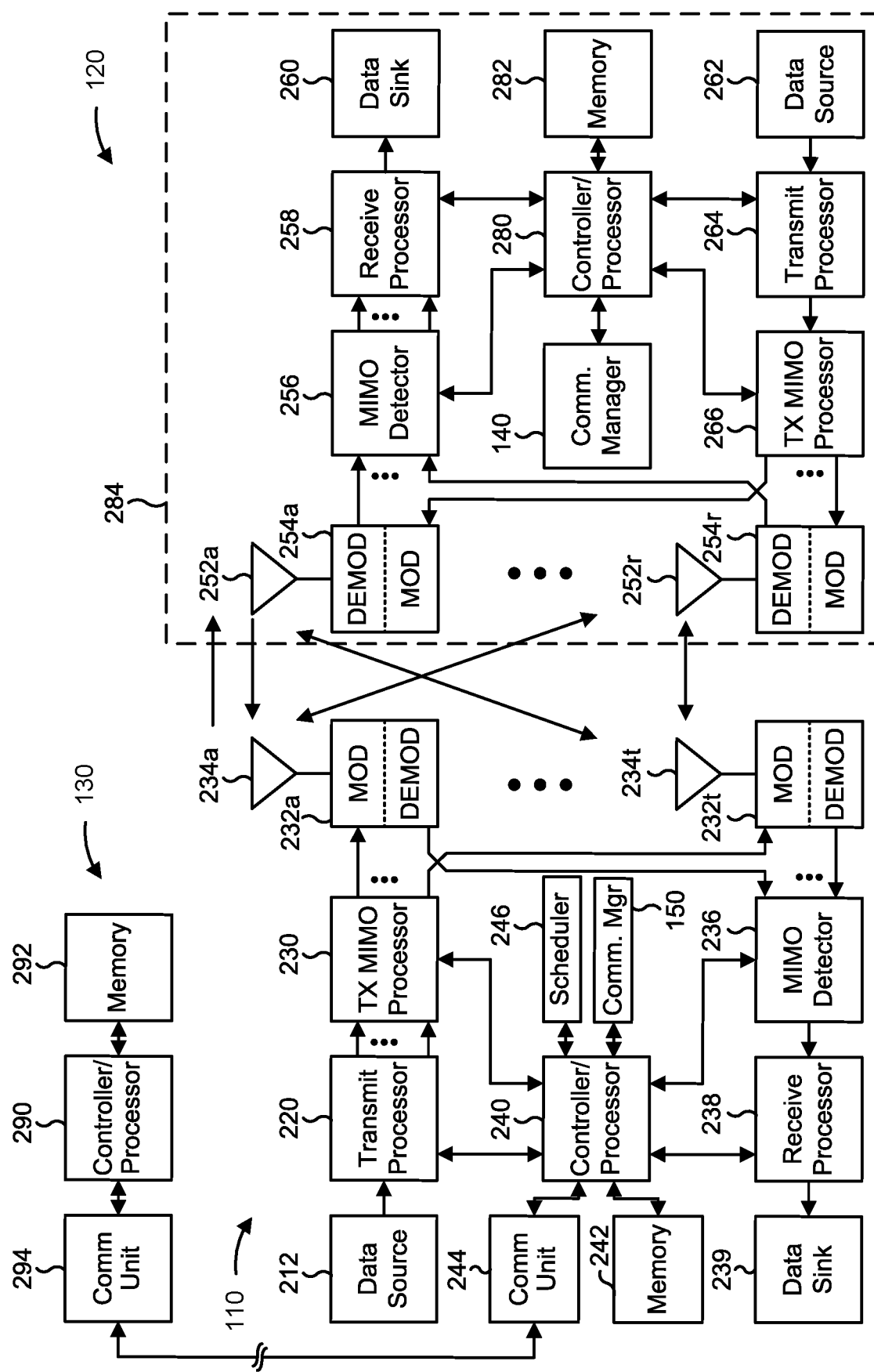
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234a through 234t, such as T antennas (T≥1). The UE 120 may be equipped with a set of antennas 252a through 252r, such as R antennas (R≥1). The network node 110 of depicted in FIG. 2 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers and/or one or more processors. A channel processor may determine an RSRP parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with C-WUS triggering and resource selection, as described in more detail elsewhere herein. For example, the controller/processor 240 of the network node 110, the controller/processor 280 of the UE 120, or any other component (s) of FIG. 2 may perform or direct operations of, for example, process 700 of FIG. 7, process 800 of FIG. 8, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 700 of FIG. 7, process 800 of FIG. 8, or other processes as described herein. In some examples, executing instructions may include running the instructions, converting the instructions, compiling the instructions, or interpreting the instructions, among other examples.

In some aspects, a UE (for example, the UE 120) includes means for receiving, from a network node, C-WUS configuration information indicating respective C-WUS resources associated with each of one or more C-WUS monitoring occasions; and/or means for transmitting, to the network node and in connection with a C-WUS triggering condition being satisfied, a C-WUS via one or more C-WUS resources of the respective C-WUS resources associated with a C-WUS monitoring occasion of the one or more C-WUS monitoring occasions, the one or more C-WUS resources being associated with a C-WUS resource selection parameter. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (for example, the network node 110) includes means for transmitting C-WUS configuration information indicating respective C-WUS resources associated with each of one or more C-WUS monitoring occasions; and/or means for receiving, in connection with a C-WUS triggering condition being satisfied at a UE, a C-WUS via one or more C-WUS resources of the respective resources associated with a C-WUS monitoring occasion of the one or more C-WUS monitoring occasions, the one or more C-WUS resources being associated with a C-WUS resource selection parameter. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (CNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, and/or one or more RUs).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
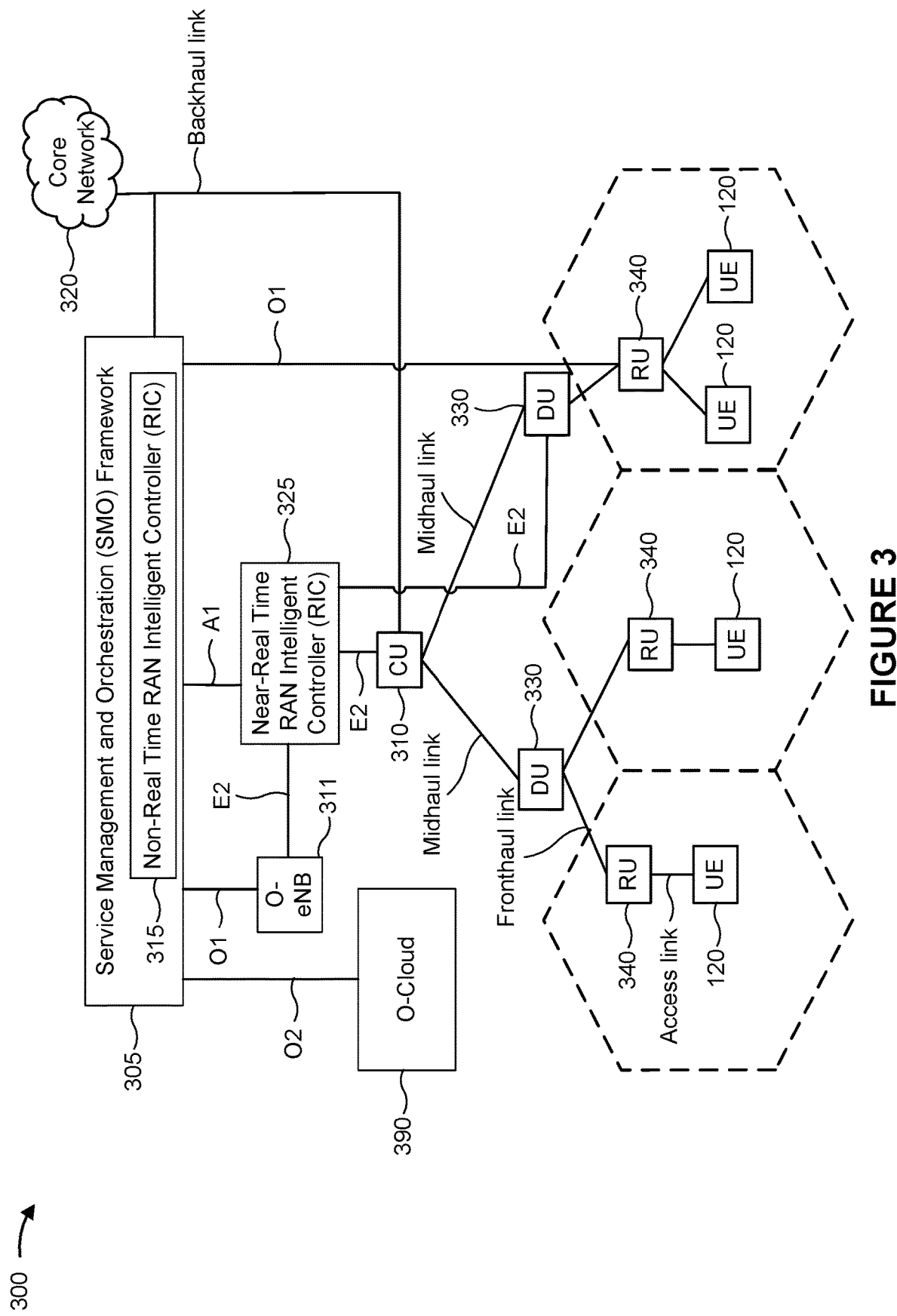
FIG. 3 is a diagram illustrating an example disaggregated base station architecture in accordance with the present disclosure.

FIG. 3 is a diagram illustrating an example disaggregated base station architecture 300 in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), and/or control plane functionality (for example, Central Unit-Control Plane (CU-CP) functionality). In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open CNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

Figure 4:
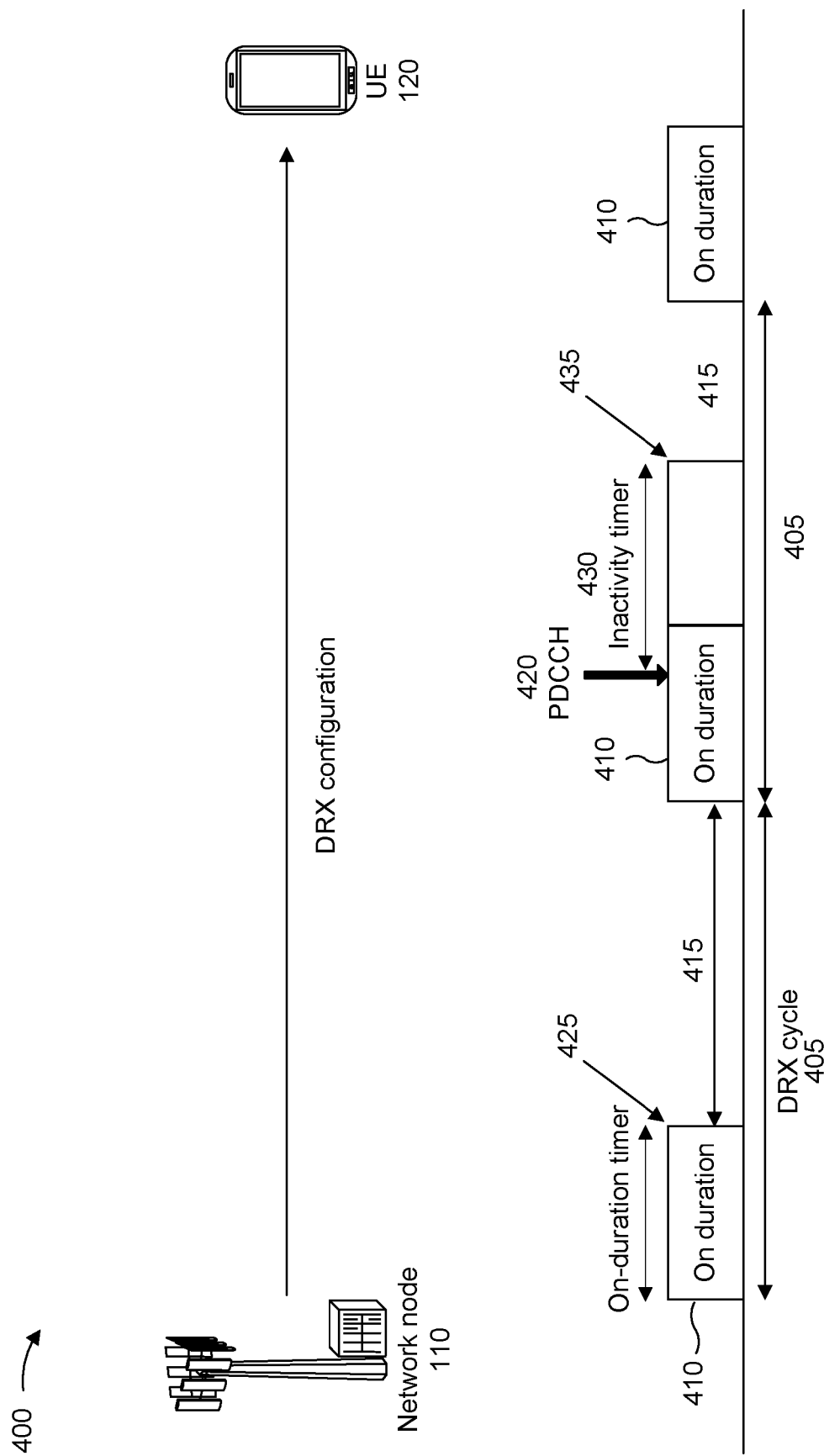
FIG. 4 is a diagram illustrating an example of a discontinuous reception (DRX) configuration, in accordance with the present disclosure.

FIG. 4 is a diagram illustrating an example 400 of a DRX configuration, in accordance with the present disclosure.

As shown in FIG. 4, a network node 110 may transmit a DRX configuration to a UE 120 to configure a DRX cycle 405 for the UE 120. In some cases, the DRX configuration may be a connected mode DRX configuration (C-DRX) that is provided to the UE 120 when the UE 120 is in a connected mode. Furthermore, the DRX configuration may be specific to the UE 120 (for example, the network node 110 may configure separate DRX cycles 405 for different UEs 120). As described herein, a DRX cycle 405 may include a DRX on duration 410 (for example, during which a UE 120 is awake or in an active state) and an opportunity to enter a DRX sleep state 415. As used herein, the time during which the UE 120 is configured to be in an active state (for example, during the DRX on duration 410 and any time during which a DRX inactivity timer 430 is running) may be referred to as an active time or a DRX active time, and the time during which the UE 120 is configured to be in the DRX sleep state 415 may be referred to as an inactive time or a DRX inactive time. As described below, the UE 120 may monitor a physical downlink control channel (PDCCH) during the DRX active time, and may refrain from monitoring the PDCCH during the DRX inactive time.

In a first operation 420, during the DRX on duration 410 (for example, the active time), the UE 120 may monitor a downlink control channel (for example, a PDCCH). For example, the UE 120 may monitor the PDCCH for downlink control information (DCI) pertaining to the UE 120. In a second operation 425, if the UE 120 does not detect and/or successfully decode any PDCCH communications intended for the UE 120 during the DRX on duration 410, then the UE 120 may enter the sleep state 415 (for example, for the inactive time) at the end of the DRX on duration 410. In this way, the UE 120 may conserve battery power and reduce power consumption. As shown, the DRX cycle 405 may repeat with a configured periodicity according to the DRX configuration.

If the UE 120 detects and/or successfully decodes a PDCCH communication intended for the UE 120, then the UE 120 may remain in an active state (for example, awake) for the duration of a DRX inactivity timer 430 (for example, which may extend the DRX active time). The UE 120 may start the DRX inactivity timer 430 at a time at which the PDCCH communication is received (for example, in a transmission time interval (TTI) in which the PDCCH communication is received, such as a slot or a subframe). In a third operation 435, the UE 120 may remain in the active state until the DRX inactivity timer 430 expires, at which time the UE 120 may enter the sleep state 415 (for example, for the DRX inactive time). During the duration of the DRX inactivity timer 430, the UE 120 may continue to monitor for PDCCH communications, may obtain a downlink data communication (for example, on a downlink data channel, such as a physical downlink shared channel (PDSCH)) scheduled by the PDCCH communication, and/or may prepare and/or transmit an uplink communication (for example, on a physical uplink shared channel (PUSCH)) scheduled by the PDCCH communication. The UE 120 may restart the DRX inactivity timer 430 after each detection of a PDCCH communication for the UE 120 for an initial transmission (for example, but not for a retransmission). By operating in this manner, the UE 120 may conserve battery power and reduce power consumption by entering the sleep state 415 during the DRX inactive time.

Figure 5:
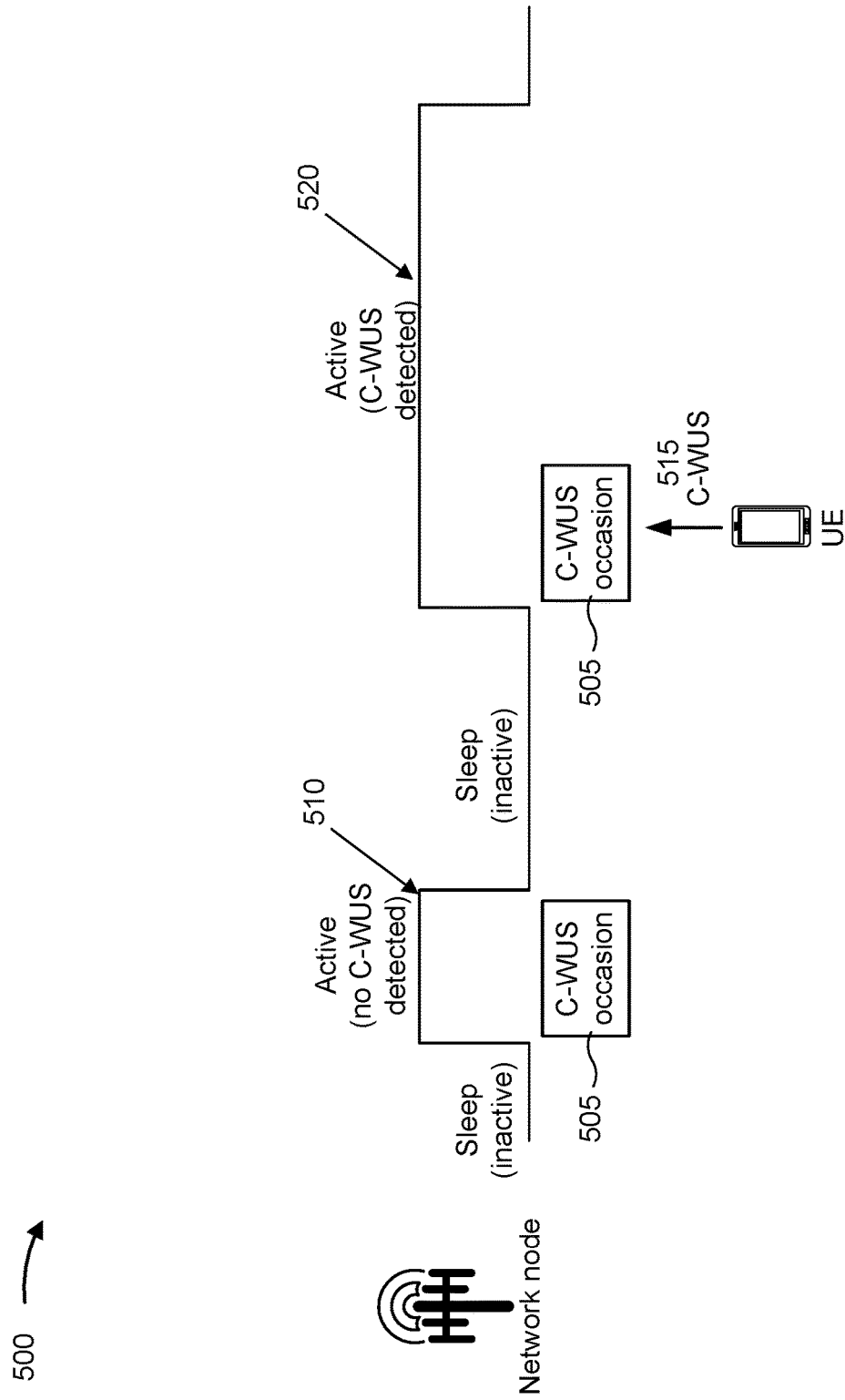
FIG. 5 is a diagram illustrating an example of cell DRX, in accordance with the present disclosure.

FIG. 5 is a diagram illustrating an example 500 of cell DRX, in accordance with the present disclosure.

One potential technique to increase energy efficiency in a RAN may be to enable cell DRX. In some aspects, a network node may transmit (for example, to one or more UEs) a cell DRX configuration to configure a cell DRX cycle. The cell DRX configuration may configure time periods in which a network node does not receive transmissions from UEs in the cell, which allows the network node to enter a sleep state. The cell DRX configuration may configure discontinuous transmission (DTX) for one or more UEs in the cell. The cell DRX configuration may also be referred to as a DTX/DRX configuration or a DTX configuration for a UE. The cell DRX configuration may have similar characteristics as a DRX configuration that may be configured for a UE. For example, the cell DRX cycle may include a cell DRX on duration (or active time), during which the network node is awake and in an active state, and a cell DRX off duration (or inactive time), during which the network node is configured to be in a sleep state. The network node may not transmit or receive channels or signals while in the sleep state. For example, the network node may not receive or monitor for uplink channel communications, random access channel (RACH) communications, or uplink reference signals, among other examples, during the cell DRX inactive time.

In some examples, the cell DRX configuration may be activated during times of the day (for example, off-peak times) in which there is no traffic or a light traffic load in the cell. However, the network node may still be required to periodically broadcast signals and/or channels, such as SSBs and system information (SI). Furthermore, the network node may still need to periodically monitor PRACH occasions for possible RACH or small data transmission (SDT) from a UE that is not is an RRC connected mode. All such periodic transmission and monitoring requires the network node to be in the active state, and thus limits network power savings that can be achieved from cell DRX. In some examples, if the network node knows that there are no connected UEs or a light traffic load in the cell, the network node may stop or slow down periodic transmission and/or periodic monitoring to achieve network power savings. However, in some cases, the network node may not be aware of whether one or more UEs need to switch to a connected state (for example, RRC connected mode) or perform some SDT so the network node can transition to the active state. In some aspects, such UEs May proactively wake up the network node by sending a C-WUS. The C-WUS may be a physical layer signal, such as a PRACH or SR.

As shown in FIG. 5, the cell DRX cycle may be configured with periodic C-WUS monitoring occasions 505 that are aligned with cell DRX on durations. The network node may switch to the active state to monitor for a C-WUS during each C-WUS monitoring occasion 505. In a first operation 510, if the network node does not detect a C-WUS during a C-WUS monitoring occasion, the network node may enter the sleep state (for example, for the inactive time or cell DRX off duration) at the end of the C-WUS monitoring occasion. A UE may transmit a C-WUS 515 to the network node during a C-WUS monitoring occasion 505. In a second operation 520, if the network node detects the C-WUS 515 during a C-WUS monitoring occasion 505, the network node may remain in the active state after the C-WUS monitoring occasion. For example, the network node may remain in the active state for the duration of a timer that extends the cell DRX active time (for example, a cell DRX inactivity timer). The network node may communicate with the UE that transmitted the C-WUS 515 while the network node is in the active state. For example, the network node may transmit SSBs, a system information block (SIB) type 1 (SIB1), and/or serve the UE for uplink data reception, among other examples.

In some examples, a UE may transmit a C-WUS to proactively wake-up a network node from a sleep state whenever an SR or BSR is triggered for the UE (for example, whenever uplink traffic arrives at or is present in an uplink buffer of the UE). However, this may result in frequent C-WUS transmissions by UEs, which may cause the network node to frequently wake up and remain in the active state, resulting in a reduction in the network power savings associated with the cell DRX mode.

Various aspects relate generally to C-WUS triggering and resource selection. Some aspects more specifically relate to a triggering condition for triggering transmission, by a UE, of a C-WUS to activate a network node from an inactive or sleep state, and selection, by the UE, of one or more resources for transmitting the C-WUS. In some aspects, a network node may transmit, and a UE may receive, C-WUS configuration information indicating C-WUS resources configured for one or more C-WUS monitoring occasions. The UE may detect whether a C-WUS triggering condition is satisfied. The UE, in connection with the C-WUS condition being satisfied, may select at least one C-WUS resource, from the C-WUS resources configured for a C-WUS monitoring occasion, based on or otherwise associated with a C-WUS resource selection parameter, and transmit a C-WUS to the network node via the selected at least one C-WUS resource.

Particular aspects of the subject matter described in this disclosure can be implemented to realize one or more of the following potential advantages. In some examples, the described techniques can be used to increase network energy efficiency and network power savings associated with a cell DRX mode. In some examples, the transmission of the C-WUS responsive to, based on, or otherwise associated with detecting that the C-WUS triggering condition is satisfied may result in a decreased frequency of C-WUS transmissions, thus resulting in reduced time durations in which the network node operates in the active state and increased network power savings.

Figure 6A:
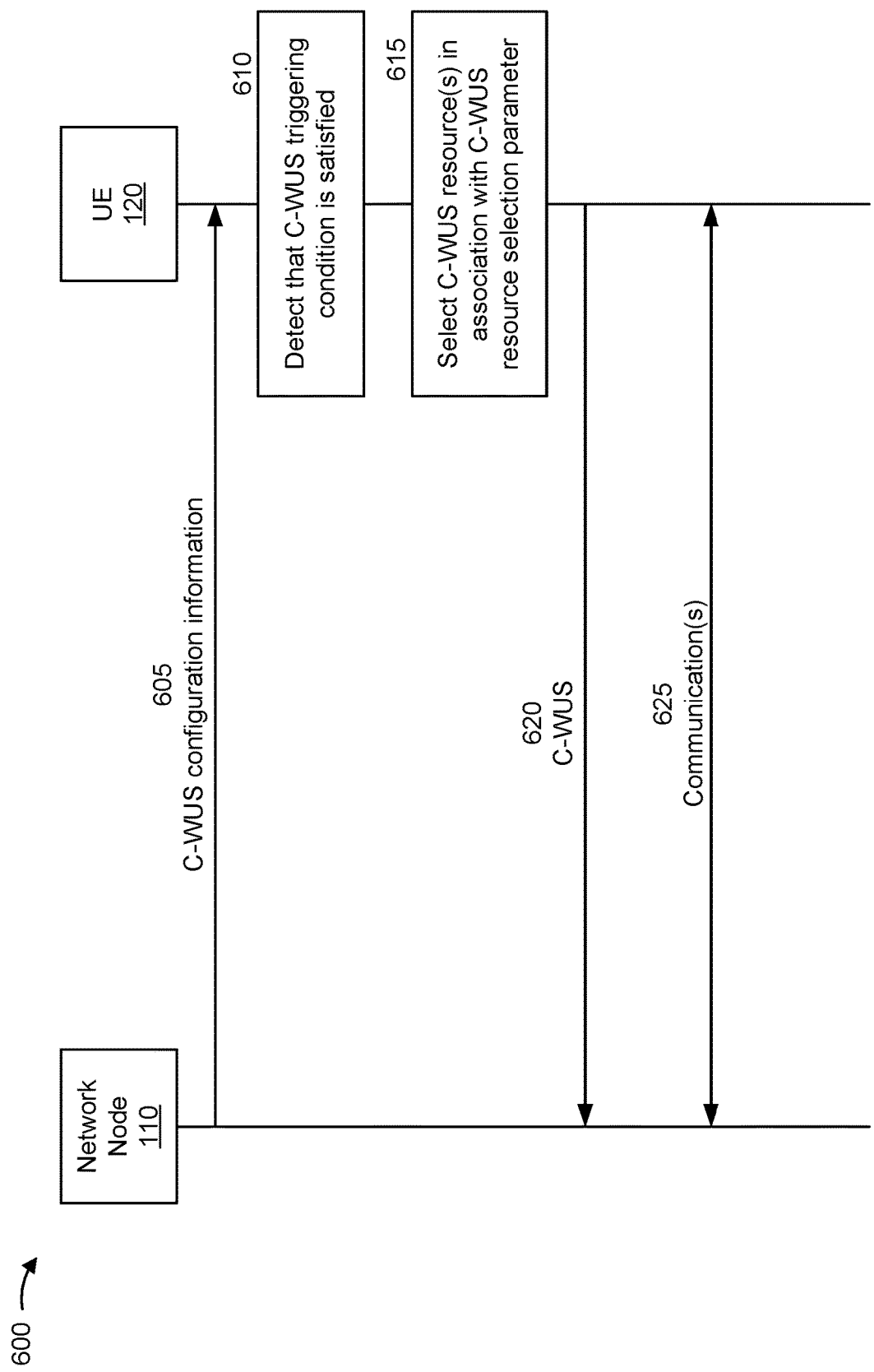
FIGS. 6A-6B are diagrams illustrating an example associated with cell wake-up signal (C-WUS) triggering and resource selection, in accordance with the present disclosure.
Figure 6B:
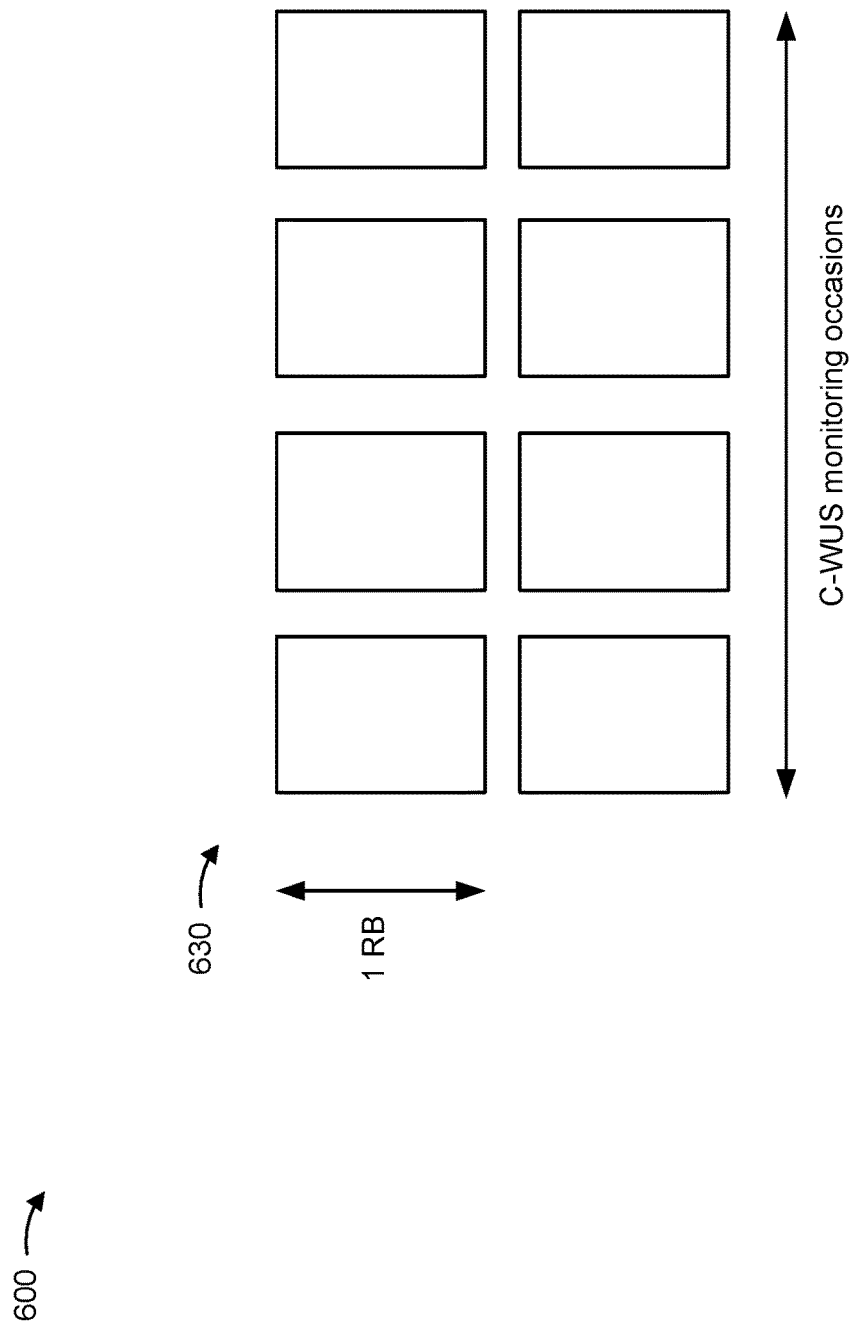

FIGS. 6A-6B are diagrams illustrating an example 600 associated with C-WUS triggering and resource selection, in accordance with the present disclosure. As shown in FIG. 6A, example 600 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

As shown in FIG. 6A, in a first operation 605, the network node 110 may transmit, and the UE 120 may receive, C-WUS configuration information. The C-WUS configuration information may indicate a configuration for a C-WUS to be transmitted to wake up the network node 110 from a sleep state, such as a sleep state associated with a cell DRX cycle. In some aspects, the C-WUS may be a sequence (for example, a baseband sequence) transmitted via a physical uplink control channel (PUCCH). For example, the sequence may be transmitted via a PUCCH format 0 communication. In some aspects, the C-WUS may be a cell-specific sequence. For example, the C-WUS configuration information may indicate the cell-specific sequence for the C-WUS and one or more cyclic shifts (CSs). In such examples, the C-WUS may be transmitted by a UE (for example, the UE 120) by generating the cell-specific sequence and shifting the cell-specific sequence using a CS of the one or more CSs indicated in the C-WUS configuration information. In some aspects, the C-WUS configuration information may indicate a pool of C-WUS resources for transmission of the C-WUS. For example, the C-WUS configuration information may allocate a pool of PUCCH format 0 resources and assign a quantity (X) of CSs to be used for transmitting the C-WUS. In some examples, the C-WUS configuration information may assign at most X=12 CSs corresponding to a quantity of resource elements (REs) in an RB.

In some aspects, the network node 110 may transmit the C-WUS configuration information that indicates the configuration of the C-WUS resources via layer 1 (L1), layer 2 (L2), or layer 3 (L3) signaling (for example, in an RRC message, a MAC control element (MAC-CE), or DCI) to the UE 120 or to a group of UEs including the UE 120. In such examples, the network node 110 the configuration of the C-WUS resources may be separately indicated to each UE or group of UEs in the cell. In some aspects, the network node 110 may broadcast the C-WUS configuration information that indicates the configuration of the C-WUS resources to UEs in the cell using L1, L2, or L3 signaling. For example, the C-WUS configuration information may be included in an SIB1, a master information block (MIB), one or more other SIBs, or a combination thereof (for example, a combination of the MIB and the SIB1).

In some aspects, the C-WUS configuration information may indicate respective C-WUS resources associated with each of one or more C-WUS monitoring occasions. The C-WUS monitoring occasions may correspond to active times in a cell DRX cycle, during which the network node 110 may switch from a sleep state to an active state to monitor for C-WUS transmissions. FIG. 6B shows an example 630 of C-WUS resources. As shown in FIG. 6B, the C-WUS resources configured in the C-WUS configuration information may include one or more respective RBs associated with each of one or more C-WUS monitoring occasions. That is, for each C-WUS monitoring occasion, a respective set of one or more RBs may be configured for C-WUS transmission in that C-WUS monitoring occasion. In some aspects, the C-WUS configuration information may indicate a C-WUS resource selection parameter to be used by the UE 120 to select one or more RBs, from the respective set of RBs associated with a C-WUS monitoring occasion, for C-WUS transmission in the C-WUS monitoring occasion. Additionally or alternatively, the C-WUS configuration information may indicate a C-WUS triggering condition (or multiple C-WUS triggering conditions) that triggers the UE 120 to transmit the C-WUS in a C-WUS monitoring occasion. The C-WUS triggering condition and the C-WUS resource selection parameter are discussed in greater detail below in connection with a second operation 610 and a third operation 615, respectively.

In some aspects, the C-WUS configuration information may enable the UE 120 to transmit one or more information bits, in addition to the C-WUS, together with the C-WUS via one or more C-WUS resources in a C-WUS monitoring occasion. The information bits may be bits, indicating any information, that are transmitted together with the C-WUS in a C-WUS monitoring occasion. In some aspects, the C-WUS configuration information may indicate multiple CSs that can be used by the UE 120 to multiplex the C-WUS and one or more information bits within a C-WUS resource allocation (for example, within one RB). In some aspects, the C-WUS configuration information may indicate multiple uplink transmission power levels that can be used by the UE 120 to multiplex the C-WUS and one or more information bits within a C-WUS resource allocation (for example, within one RB). In some aspects, the C-WUS configuration information may indicate multiple RBs, associated with a C-WUS monitoring occasion, that can be used by the UE 120 to multiplex the C-WUS and one or more information bits. In some aspects, the C-WUS configuration information may indicate multiple cell-specific sequences (for example, baseband sequences) that can be used for transmitting the C-WUS and one or more information bits within a C-WUS resource allocation (for example, one RB). Additionally or alternatively, the C-WUS configuration information may indicate any combination of multiple CSs, multiple uplink transmission power levels, multiple RBs associated with a C-WUS monitoring occasion, and/or multiple cell-specific sequences to be used by the UE 120 to transmit one or more information bits together with the C-WUS.

In some aspects, the C-WUS configuration information may assign different sets of C-WUS monitoring occasions to be used by the UE 120 for transmitting the C-WUS without additional information bits or for transmitting the C-WUS with additional information bits. For example, the C-WUS configuration information may indicate respective C-WUS resources for a first set of C-WUS monitoring occasions associated with transmission of the C-WUS without one or more additional information bits, and a second set of C-WUS monitoring occasions associated with transmission of the C-WUS together with one or more additional information bits. In such examples, the UE 120 may transmit the C-WUS without one or more additional information bits in a C-WUS monitoring occasion of the first set of C-WUS monitoring occasions, or the UE 120 may transmit the C-WUS together with one or more additional information bits in a C-WUS monitoring occasion of the second set of C-WUS monitoring occasions. Additionally or alternatively, the C-WUS configuration information may indicate different sets of C-WUS monitoring occasions associated with transmission of the C-WUS together with information bits indicating different types of information. In such examples, the C-WUS monitoring occasion in which the UE 120 transmits the C-WUS and one or more additional information bits may provide an indication to the network node 110 of which type of information is indicated by the one or more additional information bits.

In some aspects, the C-WUS configuration information may configure different C-WUS configurations for different NESs. Different NESs may correspond to different levels of energy consumption (or different target levels of energy consumption) for the network node 110. For example, the C-WUS configuration information may indicate a first C-WUS configuration associated with a first NES and a second C-WUS configuration associated with a second NES. In some aspects, the different C-WUS configurations may configure different quantities of C-WUS monitoring occasions associated with the different NESs. For example, the first C-WUS configuration (associated with the first NES) may include first C-WUS configuration information for a first set of C-WUS monitoring occasions including a first quantity (for example, 8) of C-WUS monitoring occasions, and the second C-WUS configuration (associated with the second NES) may include second C-WUS configuration information for a second set of C-WUS monitoring occasions including a second quantity (for example, 4) of C-WUS monitoring occasions. In some aspects, the C-WUS configuration information may configure a set of default C-WUS occasions (for example, associated with a default NES), and then disable some subset of the set of default C-WUS occasions based on or otherwise associated with each other NES indication. For example, the C-WUS configuration information may configure a default set of eight C-WUS monitoring occasions (for example, within a time window), and the C-WUS configuration information may indicate that four C-WUS occasions of the default set of C-WUS monitoring occasions are deactivated in a low energy NES.

In some aspects, the C-WUS configuration information may configure more or fewer C-WUS resources associated with different NESs. For example, the first C-WUS configuration (associated with the first NES) may indicate a first set of C-WUS resources for C-WUS monitoring occasions associated with the first NES, and the second C-WUS configuration (associated with the second NES) may indicate a second set of C-WUS resources for C-WUS monitoring occasions associated with the second NES. In such examples, a first quantity of the first set of C-WUS resources may be different than a second quantity of the second set of C-WUS resources. For example, the second quantity may be less than the first quantity in connection with the second NES being a lower energy NES, as compared with the first NES.

As further shown in FIG. 6A, in a second operation 610, the UE 120 may detect that a C-WUS triggering condition is satisfied. Prior to the UE 120 transmitting a C-WUS in a C-WUS monitoring occasion to wake up the network node 110 from a sleep state, the UE 120 may detect whether a C-WUS triggering condition is satisfied. In some aspects, the C-WUS triggering condition may be associated with one or more conditions, in addition to the availability or arrival of uplink data in an uplink buffer that triggers an SR or BSR. In some aspects, the UE 120 may detect whether the C-WUS triggering condition is satisfied responsive to, based on, or otherwise associated with an SR or BSR being triggered (for example, responsive to, based on, or otherwise associated with a determination that uplink data is available or has arrived in an uplink buffer of the UE 120). If the C-WUS triggering condition is satisfied, the UE 120 may proceed with selecting at least one C-WUS resource and transmitting the C-WUS, as shown in FIG. 6A. If the C-WUS triggering condition is not satisfied, the UE 120 may refrain from transmitting the C-WUS, even though the UE 120 has uplink data to be transmitted in the uplink buffer of the UE 120 (for example, even though the UE 120 determines that an SR or BSR has been triggered).

In some aspects, the C-WUS triggering condition (or multiple C-WUS triggering conditions) may be configured by the network node 110. For example, the C-WUS triggering condition (or multiple C-WUS triggering conditions) may be indicated in the C-WUS configuration information or in another downlink communication transmitted by the network node 110 (for example, via L1, L2, or L3 signaling). In some other aspects, the C-WUS triggering condition (or multiple C-WUS triggering conditions) may be defined by a wireless communication standard and stored by the UE 120.

In some aspects, the C-WUS triggering condition may be based on or otherwise associated with an uplink buffer size of the UE 120. The uplink buffer size of the UE 120 refers to the size or amount of uplink data, to be transmitted by the UE 120, in the uplink buffer of the UE 120. In some aspects, the UE 120 may detect that the C-WUS triggering condition is satisfied in connection with the uplink buffer size of the UE 120 satisfying a threshold. For example, C-WUS transmission by the UE 120 may be triggered only when the uplink buffer size satisfies the threshold (for example, the uplink buffer size is greater than the threshold or the uplink buffer size is greater than or equal to the threshold). In some aspects, the threshold may be configured in the MIB, the SIB1, or via MAC-CE or RRC signaling. For example, the threshold may be indicated in the C-WUS configuration information or in another downlink communication transmitted by the network node 110. In some aspects, the threshold may be associated with an NES of the network node 110. Different threshold values may be configured (for example, in the C-WUS configuration information) or specified in a wireless communication standard for different NESs. In some aspects, the threshold may be associated with a priority of the uplink traffic in the uplink buffer of the UE 120. For example, a first threshold may be configured or defined for a first priority (for example, a lower priority) of traffic arriving to the uplink buffer, already present in the uplink buffer, or a combination thereof, and a second threshold may be configured or defined for a second priority (for example, a higher priority) of traffic arriving to the uplink buffer, already present in the uplink buffer, or a combination thereof. In some aspects, the threshold may be associated with a logical channel (LCH) or logical channel group (LCG). For example, different thresholds may be configured or defined for different LCHs or LCGs.

In some aspects, the C-WUS triggering condition may be based on or otherwise associated with an uplink latency experienced by the UE 120. For example, a C-WUS transmission by the UE 120 may be triggered when the uplink latency experienced by the UE 120 approaches a remaining packet delay budget (PDB). That is, the UE 120 may detect that the C-WUS triggering condition is satisfied in connection with the uplink latency of packets in the uplink buffer of the UE 120 being within a threshold of the remaining PDB. For example, the threshold may be configured in the C-WUS configuration information or defined in a wireless communication standard. In such examples, the C-WUS triggering condition may enable the UE 120 to wake up the network node 110 from a sleep state for the transmission of latency sensitive traffic by the UE 120, while increasing network energy savings by enabling the network node 110 to remain in the sleep state when the uplink traffic to be transmitted is not latency sensitive. In some examples, the UE 120 may generate a delay status report (DSR) that indicates a waiting time ($T_{wait}$) for packets in the uplink buffer of the UE 120 and the remaining PDB for the packets in the uplink buffer of the UE 120. In such examples, the DSR may be used to trigger C-WUS transmission by the UE 120. For example, the UE 120 may compare $T_{wait}$ determined for the DSR to the remaining PDB determined for the DSR to detect whether the uplink latency (for example, $T_{wait}$) is within the threshold of the remaining PDB. In some other examples, the UE 120 may generate a statistical delay report (SDR) that includes information or statistics related to $T_{wait}$ and/or the remaining PDB for the packets in the uplink buffer of the UE 120 for each LCG or across LCGs. In such examples, the UE 120 may determine the uplink latency (for example, $T_{wait}$) and/or the PDB based on or otherwise associated with the information or statistics indicated in the SDR.

In some aspects, the C-WUS triggering condition may be based on or otherwise associated with RSRP measurements of downlink reference signals (for example, CSI-RSs or SSBs). For example, C-WUS transmission by the UE 120 may be triggered responsive to, based on, or otherwise associated with a drop in downlink RSRP measurements of a measured CSI-RS or SSB. In such examples, the UE 120 may detect that the C-WUS triggering condition is satisfied in connection with detecting a drop in an RSRP measurement of a measured CSI-RS or SSB that satisfies a threshold. For example, the threshold may be configured (for example, in the C-WUS configuration information) or defined in a wireless communication standard. In such examples, triggering the C-WUS transmission based on or otherwise associated with a drop in downlink RSRP may be advantageous in aiding a decision, by the network node 110 or another network device, of whether to increase a density of the SSBs transmitted by the network node 110. Triggering the C-WUS transmission based on or otherwise associated with a drop in downlink RSRP may also be advantageous in avoiding RLF at the UE 120.

In some aspects, the C-WUS triggering condition may be based on or otherwise associated with an energy level of the UE 120. For example, the UE 120 may detect that that C-WUS triggering condition is satisfied in connection with the energy level of the UE 120 satisfying a threshold. That is, C-WUS transmission by the UE 120 may be triggered based on or otherwise associated with the energy level of the UE 120 satisfying the threshold (for example, the energy level being greater than the threshold or the energy level being greater than or equal to the threshold). In some examples, the threshold may be indicated via RRC or MAC-CE signaling transmitted by the network node 110 or configured in the MIB, SIB1, or one or more other SIBs broadcast by the network node 110. For example, the threshold may be indicated in the C-WUS configuration information or another downlink communication transmitted by the network node 110. In some other examples, the threshold may be defined by a wireless communication standard. In some examples, the threshold may be associated with an NES of the network node 110. For example, different thresholds may be configured (for example, in the C-WUS configuration information) or defined by a wireless communication standard for different NESs. In some aspects, the energy level of the UE 120 may be based on or otherwise associated with an energy report determined by the UE 120. For example, the energy report may include at least one of a charging rate profile of the UE 120, a discharging rate profile of the UE 120, or an energy state profile (or energy level profile) of the UE 120. The charging rate profile may indicate a current charging rate of the UE 120 and, in some examples, a prediction of the charging rate across one or more time intervals (for example, one or more configured or pre-configured time intervals). The discharging rate profile may indicate a current discharging rate (or power consumption rate) of the UE 120 and, in some examples, a prediction of the discharging rate across one or more time intervals (for example, one or more configured or pre-configured time intervals). The energy state profile (or energy level profile) may indicate a current energy level (for example, a battery or energy storage level) of the UE 120 and, in some examples, a prediction of the energy level of the UE 120 across one or more time intervals (for example, one or more configured or pre-configured time intervals).

In some aspects, the C-WUS triggering condition may be based on or otherwise associated with the discharging rate (or power consumption rate) of the UE 120. For example, the UE 120 may detect that the C-WUS triggering condition is satisfied in connection with the discharging rate of the UE 120 satisfying a threshold. That is, a C-WUS transmission by the UE 120 may be triggered based on or otherwise associated with the discharging rate of the UE 120 satisfying the threshold (for example, the discharging rate being greater than the threshold or the discharging rate being greater than or equal to the threshold). In such examples, triggering the C-WUS transmission based on or otherwise associated with the discharging rate satisfying the threshold enables the UE 120 to wake up the network node 110 and be served quickly when the power consumption of the UE 120 is high, such that the UE 120 can then enter a sleep state and/or turn off at least one of hardware, software, firmware, or RF components of the UE 120 to reduce power consumption at the UE 120.

In some aspects, the C-WUS triggering condition may be based on or otherwise associated with a mapping function or criterion associated with at least one of the charging rate profile of the UE 120, the discharging rate profile of the UE 120, or the energy state profile (or energy level profile) of the UE 120. For example, the UE 120 may detect that the C-WUS triggering condition is satisfied in connection with the mapping function or criterion associated with the charging rate profile, the discharging rate profile, and/or the energy state profile. In such examples, the mapping function or criterion may be configured (for example, indicated in the C-WUS configuration information) or defined by a wireless communication standard.

As further shown in FIG. 6A, in a third operation 615, the UE 120 may select at least one C-WUS resource, from the respective one or more C-WUS resources associated with (for example, configured in the C-WUS configuration information for) a C-WUS monitoring occasion. For example, the UE 120 may select at least one C-WUS resource, from the C-WUS resources configured for a C-WUS monitoring occasion, in connection with (for example, responsive to, based on or otherwise associated with) the UE 120 detecting that the C-WUS triggering condition is satisfied. In some aspects, the at least one C-WUS resource, selected by the UE 120, may be based on or otherwise associated with a C-WUS resource selection parameter. That is, the UE 120 may select the at least one C-WUS resource, from the C-WUS resources associated with the C-WUS monitoring occasion, based or otherwise in association with the C-WUS resource selection parameter. For example, the UE 120 may select, from a set of RBs configured for the C-WUS monitoring occasion, one or more RBs for transmitting the C-WUS based on or otherwise in association with the C-WUS resource selection parameter.

In some aspects, the C-WUS resource selection parameter may be indicated in the C-WUS configuration information or in another downlink communication transmitted by the UE 120. For example, the C-WUS configuration information may indicate which parameter (for example, a type of parameter) is to be used by the UE 120 as the C-WUS resource selection parameter and/or a value for the C-WUS resource selection parameter. In some aspects, the UE 120 may use the C-WUS resource selection parameter as a seed for random or pseudo-random selection of the RB (or multiple RBs) from the configured pool of RBs. In some other aspects, the UE 120 may select the RB (or multiple RBs) based on or otherwise associated with a mapping between different values for the C-WUS resource selection parameter and different RBs. For example, the mapping may be configured in the C-WUS configuration information.

In some aspects, the C-WUS resource selection parameter may be a scrambling ID. For example, the C-WUS resource selection parameter may be a configured scrambling ID indicated in the C-WUS configuration information. In such examples, the UE 120 may select one or more C-WUS resources (for example, one or more RBs) for transmitting the C-WUS in a C-WUS monitoring occasion based on or otherwise associated with the configured scrambling ID. For example, the UE 120 may select the one or more C-WUS resources using random or pseudo-random resource selection based on or otherwise associated with the configured scrambling ID.

In some aspects, the C-WUS resource selection parameter may be a cell-specific sequence. For example, the C-WUS resource selection parameter may be a cell-specific sequence for the C-WUS indicated in the C-WUS configuration information. In such examples, the UE 120 may select one or more C-WUS resources (for example, one or more RBs) for transmitting the C-WUS in a C-WUS monitoring occasion based on or otherwise associated with the cell-specific sequence for the C-WUS. For example, the UE 120 may select the one or more C-WUS resources using random or pseudo-random resource selection based on or otherwise associated with the cell-specific sequence, or the UE 120 may select the one or more C-WUS resources based on or otherwise associated with a mapping between the cell-specific sequence and the one or more C-WUS resources.

In some aspects, the C-WUS resource selection parameter may be a UE ID associated with the UE 120. In such examples, the UE 120 may select one or more C-WUS resources (for example, one or more RBs) for transmitting the C-WUS in a C-WUS monitoring occasion based on or otherwise associated with the UE ID associated with the UE 120. For example, the UE 120 may select the one or more C-WUS resources using random or pseudo-random resource selection based on or otherwise associated with the UE ID.

In some aspects, the C-WUS resource selection parameter may be a UE group ID associated with a group of UEs including the UE 120. In such examples, the UE 120 may select one or more C-WUS resources (for example, one or more RBs) for transmitting the C-WUS in a C-WUS monitoring occasion based on or otherwise associated with the UE group ID. For example, the UE 120 may select the one or more C-WUS resources using random or pseudo-random resource selection based on or otherwise associated with the UE group ID.

In some aspects, the C-WUS resource selection parameter may be a latest SSB index or CSI-RS index associated with the UE 120 known at the network node 110. That is, the C-WUS resource selection parameter may be a latest SSB index or CSI-RS index indicated by the UE 120 to the network node 110. In such examples, the UE 120 may select one or more C-WUS resources (for example, one or more RBs) for transmitting the C-WUS in a C-WUS monitoring occasion based on or otherwise associated with the latest SSB index or CSI-RS index indicated by the UE 120 to the network node 110. For example, the UE 120 may select the one or more C-WUS resources based on or otherwise associated with a mapping between the latest indicated SSB index or CSI-index and the one or more C-WUS resources, or the UE 120 may select the one or more C-WUS resources using random or pseudo-random resource selection based on or otherwise associated with the latest indicated SSB index or CSI-index.

In some aspects, the C-WUS resource selection parameter may be an SSB index selected by the UE 120. For example, the UE 120 may change an SSB index (for example, based on or otherwise associated with SSB measurements performed by the UE 120), from a previously indicated SSB index, prior to transmitting the C-WUS. In such examples, the UE 120 may select a new SSB index, as compared to a latest SSB index indicated by the UE 120, and the UE 120 may use the selected SSB index (for example, the network entity SSB index) as the C-WUS resource selection parameter. For example, the UE 120 may select one or more C-WUS resources (for example, one or more RBs) for transmitting the C-WUS in a C-WUS monitoring occasion that are based on or otherwise associated with the selected SSB index (for example, using a mapping between the SSB index and the one or more C-WUS resources, or using random or pseudo-random resource selection based on or otherwise associated with the selected SSB index). In such examples, because the selected one or more C-WUS resources (for example, one or more RBs) are based on or otherwise associated with the selected SSB index, the selected one or more C-WUS resources used to transmit the C-WUS may provide an indication to the network node 110 of the new SSB index (for example, the selected SSB index) associated with the UE 120.

In some aspects, the C-WUS resource selection parameter may be an index of a reference signal associated with a WUR of the UE 120. For example, the reference signal may be a low-power synchronization signal (LP-SS) used by the UE 120 for synchronization of at least one of the WUR or an MR of the UE 120, or the reference signal may be a low-power reference signal (LP-RS) used for a radio resource management (RRM) measurement performed by the WUR of the UE 120. In such examples, the UE 120 may select one or more C-WUS resources (for example, one or more RBs) for transmitting the C-WUS in a C-WUS monitoring occasion based on or otherwise associated with the index of the reference signal (for example, the LP-SS or the LP-RS) associated with the WUR of the UE 120. For example, the UE 120 may select the one or more C-WUS resources based on or otherwise associated with a mapping between the index of the reference signal and the one or more C-WUS resources, or the UE 120 may select the one or more C-WUS resources using random or pseudo-random resource selection based on or otherwise associated with the index of the reference signal.

In some aspects, the C-WUS resource selection parameter may be associated with a class or type of the UE 120. For example, the C-WUS resource selection parameter may be an index indicating the class or type of the UE 120. In such examples, the UE 120 may select one or more C-WUS resources (for example, one or more RBs) for transmitting the C-WUS in a C-WUS monitoring occasion that are based on or otherwise associated with the class or type of the UE 120.

In some aspects, the C-WUS resource selection parameter may be associated with a class or type of a WUR of the UE 120. For example, the C-WUS resource selection parameter may be an index indicating the class or type of the WUR of the UE 120. In such examples, the UE 120 may select one or more C-WUS resources (for example, one or more RBs) for transmitting the C-WUS in a C-WUS monitoring occasion that are based on or otherwise associated with the class or type of the WUR of the UE 120.

In some aspects, the C-WUS resource selection parameter may be associated with a class or type of an MR of the UE 120. For example, the C-WUS resource selection parameter may be an index indicating the class or type of the MR of the UE 120. In such examples, the UE 120 may select one or more C-WUS resources (for example, one or more RBs) for transmitting the C-WUS in a C-WUS monitoring occasion that are based on or otherwise associated with the class or type of the MR of the UE 120.

In some aspects, the C-WUS resource selection parameter may be associated with an NES of the network node 110. For example, different C-WUS resources and/or different C-WUS occasions may be configured for different NESs of the network node 110. In such examples, the UE 120 may select one or more C-WUS resources (for example, one or more RBs) for transmitting the C-WUS in a C-WUS monitoring occasion that are based on or otherwise associated with the NES of the network node 110.

As further shown in FIG. 6A, in a fourth operation 620, the UE 120 may transmit a C-WUS in a C-WUS monitoring occasion. The UE 120 may transmit the C-WUS, in the C-WUS monitoring occasion, via the at least one C-WUS resource (for example, the one or more selected RBs) selected based on or otherwise associated with the C-WUS resource selection parameter. In some aspects, the UE 120 may transmit the C-WUS in the C-WUS monitoring occasion in connection with the UE 120 detecting that the C-WUS triggering condition is satisfied. In some other aspects, the UE 120 may refrain from transmitting a C-WUS in a C-WUS monitoring occasion in connection with the UE 120 detecting that the C-WUS triggering condition is not satisfied. In some aspects, the C-WUS configuration information may indicate a cell-specific sequence for the C-WUS and one or more CSs, and the UE 120 may transmit, via the selected one or more C-WUS resources in the C-WUS monitoring occasion, the cell-specific sequence shifted with a CS of the one or more CSs.

In some aspects, the UE 120 may transmit an additional one or more information bits, together with the C-WUS, in the C-WUS monitoring occasion. For example, the UE 120 may multiplex the C-WUS with one or more information bits in the selected one or more C-WUS resources (for example, the selected one or more RBs) associated with the C-WUS monitoring occasion. In some examples, the C-WUS configuration information may indicate multiple CSs, and the UE 120 may multiplex the C-WUS and the one or more information bits (for example, in an RB) by transmitting the C-WUS and the one or more information bits using different respective CSs of the multiple CSs. In some examples, the C-WUS configuration information may indicate multiple uplink transmission powers, and the UE 120 may multiplex the C-WUS and the one or more information bits (for example, in an RB) by transmitting the C-WUS and the one or more information bits using different respective uplink transmission powers of the multiple uplink transmission powers. In some examples, the C-WUS configuration information may indicate multiple RBs associated with the C-WUS monitoring occasion, and the UE 120 may multiplex the C-WUS and the one or more information bits by transmitting the C-WUS and the one or more information bits using different respective RBs of the multiple RBs associated with the C-WUS monitoring occasion. In some examples, the C-WUS configuration information may indicate multiple cell-specific sequences, and the UE 120 may multiplex the C-WUS and the one or more information bits (for example, in an RB) by transmitting the C-WUS and the one or more information bits using different cell-specific sequences of the multiple cell-specific sequences. In some aspects, the one or more information bits, transmitted together with the C-WUS in the C-WUS monitoring occasion, may indicate, to the network node 110, various information associated with the UE 120 or uplink traffic to be transmitted by the UE 120. For example, the UE 120 may indicate, in the one or more information bits transmitted together with the C-WUS, at least one of BSR information, an energy state (or energy level) of the UE 120, a charging rate of the UE 120, a discharging rate of the UE 120, a waiting time for one or more packets in an uplink buffer of the UE 120, a remaining packet delay budget for the one or more packets in the uplink buffer of the UE 120, or an SSB index, among other examples.

The network node 110 may monitor the C-WUS monitoring occasions configured in the C-WUS configuration information. For example, the network node 110 may be in an inactive state (or sleep state) between the C-WUS monitoring occasions, and the network node 110 may switch to an active state during the C-WUS monitoring occasions to monitor for C-WUS transmissions. In some aspects, the network node 110 may receive the C-WUS transmitted by the UE 120 in a C-WUS monitoring occasion. For example, the network node 110 may receive the C-WUS transmitted by the UE 120, in connection with the C-WUS triggering condition being satisfied at the UE 120, via at least one C-WUS resource, of the C-WUS resources configured for the C-WUS monitoring occasion, that is based on or otherwise associated with the C-WUS resource selection parameter. In some aspects, the network node 110 may switch from a first NES to a second NES responsive to, based on, or otherwise associated with receiving the C-WUS. For example, the network node 110 may remain in the active state after the C-WUS monitoring occasion (instead of returning to the inactive state) in connection with receiving the C-WUS. In some aspects, the network node 110 may receive one or more information bits multiplexed with the C-WUS in the one or more C-WUS resources associated with the C-WUS monitoring occasion.

As further shown in FIG. 6A, in a fifth operation 625, the network node 110 and the UE 120 may communicate responsive to, based on, or otherwise associated with the UE 120 transmitting and the network node 110 receiving the C-WUS in the C-WUS monitoring occasion. The network node 110 may switch to (or remain in) an active state responsive to, based on, or otherwise associated with receiving the C-WUS. The UE 120 may transmit, and the network node 110 may receive, one or more uplink communications while the network node 110 is operating in the active state. Additionally or alternatively, the network node 110 may transmit, and the UE 120 may receive, one or more downlink communications while the network node 110 is operating in the active state. In some examples, the network node may transmit SSBs, a SIB1, and/or serve the UE 120 for uplink data reception, among other examples. In some examples, the UE 120 may transmit an SR or BSR to the network node 110, and/or the UE 120 may transmit uplink data to the network node 110 in one or more uplink communications (for example, one or more dynamic grant uplink communications and/or one or more configured grant uplink communications). In some examples, the UE 120 may communicate with the network node 110 (for example, via one or more RACH communications) to establish an RRC connection with the network node 110.

As discussed above in connection with the second operation 610 and the third operation 615, the UE 120 may detect whether the C-WUS triggering condition is satisfied, and the UE 120 may select at least one C-WUS resource in association with a resource selection parameter. In some aspects, the detection of whether the C-WUS triggering condition is satisfied may be performed in conjunction with the C-WUS resource selection by the UE 120. For example, the C-WUS configuration information may indicate respective C-WUS resources configured for each C-WUS monitoring occasion of a first set of C-WUS monitoring occasions associated with the C-WUS triggering condition being satisfied, and the C-WUS configuration information may indicate a null resource set configured for a second set of C-WUS monitoring occasions associated with the C-WUS triggering condition not being satisfied. The detection of whether the C-WUS triggering condition is satisfied, and the C-WUS resource selection, may be performed by the UE 120 responsive to, based on, or otherwise associated with triggering of an SR or BSR. For example, when an SR or BSR is triggered at the UE 120, the UE 120 may detect whether the C-WUS triggering condition is satisfied. If the UE 120 detects that the C-WUS triggering condition is satisfied, the UE 120 may select, in the C-WUS resource selection, at least one C-WUS resource configured for a C-WUS monitoring occasion of the first set of C-WUS monitoring occasions. In such examples, the UE 120 may then transmit the C-WUS via the selected at least one resource in the C-WUS monitoring occasion. If the UE 120 detects that the C-WUS triggering condition is not satisfied, the UE 120 may select, in the C-WUS resource selection, the null resource set associated with a C-WUS monitoring occasion of the second set of C-WUS monitoring occasions. In such examples, the UE 120 may refrain from transmitting the C-WUS in the C-WUS monitoring occasion in connection with the null resource set being associated with the C-WUS monitoring occasion.

Figure 7:
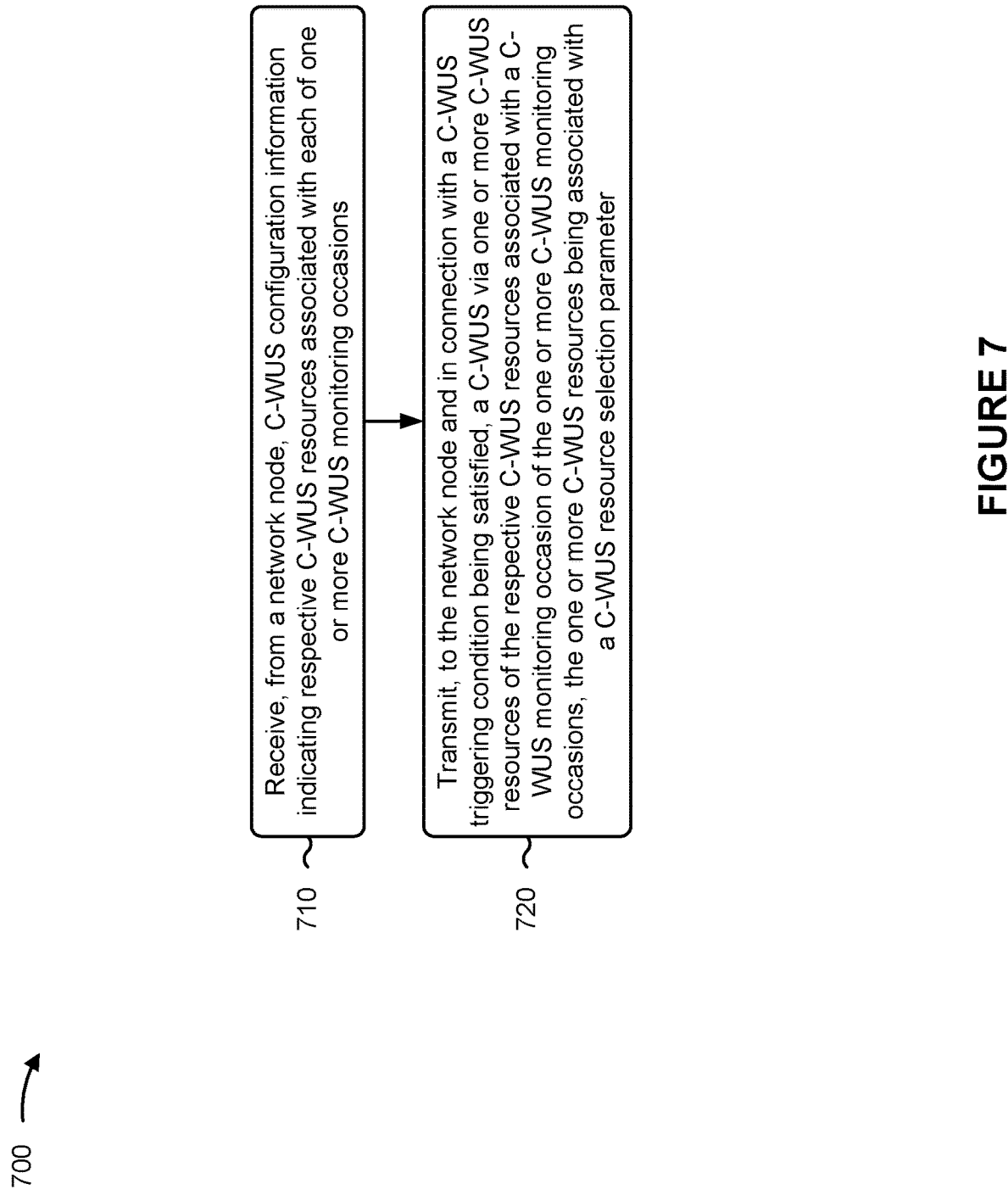
FIG. 7 is a flowchart illustrating an example process performed, for example, by a UE that supports C-WUS triggering and resource selection in accordance with the present disclosure.

FIG. 7 is a flowchart illustrating an example process 700 performed, for example, by a UE that supports C-WUS triggering and resource selection in accordance with the present disclosure. Example process 700 is an example where the UE (for example, UE 120) performs operations associated with C-WUS triggering and resource selection.

As shown in FIG. 7, in some aspects, process 700 may include receiving, from a network node, C-WUS configuration information indicating respective C-WUS resources associated with each of one or more C-WUS monitoring occasions (block 710). For example, the UE (such as by using communication manager 140 or reception component 902, depicted in FIG. 9) may receive, from a network node, C-WUS configuration information indicating respective C-WUS resources associated with each of one or more C-WUS monitoring occasions, as described above.

As further shown in FIG. 7, in some aspects, process 700 may include transmitting, to the network node and in connection with a C-WUS triggering condition being satisfied, a C-WUS via one or more C-WUS resources of the respective C-WUS resources associated with a C-WUS monitoring occasion of the one or more C-WUS monitoring occasions, the one or more C-WUS resources being associated with a C-WUS resource selection parameter (block 720). For example, the UE (such as by using communication manager 140 or transmission component 904, depicted in FIG. 9) may transmit, to the network node and in connection with a C-WUS triggering condition being satisfied, a C-WUS via one or more C-WUS resources of the respective C-WUS resources associated with a C-WUS monitoring occasion of the one or more C-WUS monitoring occasions, the one or more C-WUS resources being associated with a C-WUS resource selection parameter, as described above.

Process 700 may include additional aspects, such as any single aspect or any combination of aspects described below or in connection with one or more other processes described elsewhere herein.

In a first additional aspect, the respective resources associated with each of the one or more C-WUS monitoring occasions are PUCCH resources.

In a second additional aspect, alone or in combination with the first aspect, the C-WUS configuration information indicates a cell-specific sequence for the C-WUS and one or more cyclic shifts, and transmitting the C-WUS includes transmitting, via the one or more C-WUS resources, the cell-specific sequence with a cyclic shift of the one or more cyclic shifts.

In a third additional aspect, alone or in combination with one or more of the first and second aspects, the C-WUS configuration information is included in at least one of an RRC message, a MAC-CE, or DCI.

In a fourth additional aspect, alone or in combination with one or more of the first through third aspects, the C-WUS configuration information is included in at least one of an MIB, an SIB1, or another SIB.

In a fifth additional aspect, alone or in combination with one or more of the first through fourth aspects, process 700 includes selecting the one or more C-WUS resources in association with the C-WUS resource selection parameter.

In a sixth additional aspect, alone or in combination with one or more of the first through fifth aspects, the respective C-WUS resources associated with each of the one or more C-WUS monitoring occasions include one or more respective RBs associated with each of the one or more C-WUS monitoring occasions, and selecting the one or more C-WUS resources includes selecting at least one RB from the one or more respective RBs associated with the C-WUS monitoring occasion in association with the C-WUS resource selection parameter.

In a seventh additional aspect, alone or in combination with one or more of the first through sixth aspects, the C-WUS configuration information indicates the C-WUS resource selection parameter to be used for selecting the one or more C-WUS resources.

In an eighth additional aspect, alone or in combination with one or more of the first through seventh aspects, the C-WUS resource selection parameter is a scrambling ID, and the scrambling ID is indicated in the C-WUS configuration information.

In a ninth additional aspect, alone or in combination with one or more of the first through eighth aspects, the C-WUS resource selection parameter is a cell-specific sequence for the C-WUS, and the cell-specific sequence is indicated in the C-WUS configuration information.

In a tenth additional aspect, alone or in combination with one or more of the first through ninth aspects, the C-WUS resource selection parameter is a UE ID associated with the UE.

In an eleventh additional aspect, alone or in combination with one or more of the first through tenth aspects, the C-WUS resource selection parameter is a UE group ID associated with a group of UEs including the UE.

In a twelfth additional aspect, alone or in combination with one or more of the first through eleventh aspects, the C-WUS resource selection parameter is a latest SSB index or CSI-RS index indicated by the UE to the network node.

In a thirteenth additional aspect, alone or in combination with one or more of the first through twelfth aspects, the C-WUS resource selection parameter is an SSB index selected by the UE.

In a fourteenth additional aspect, alone or in combination with one or more of the first through thirteenth aspects, the C-WUS resource selection parameter is an index of a reference signal associated with a WUR of the UE.

In a fifteenth additional aspect, alone or in combination with one or more of the first through fourteenth aspects, the reference signal is an LP-SS associated with synchronization of the WUR of the UE or an LP-RS associated with an RRM measurement performed by the WUR of the UE.

In a sixteenth additional aspect, alone or in combination with one or more of the first through fifteenth aspects, the C-WUS resource selection parameter is at least one of a class or type of the UE, a class or type of a WUR of the UE, or a class or type of an MR of the UE.

In a seventeenth additional aspect, alone or in combination with one or more of the first through sixteenth aspects, the C-WUS resource selection parameter is associated with a network energy state of the network node.

In an eighteenth additional aspect, alone or in combination with one or more of the first through seventeenth aspects, transmitting the C-WUS includes multiplexing the C-WUS with one or more information bits in the one or more C-WUS resources associated with the C-WUS monitoring occasion.

In a nineteenth additional aspect, alone or in combination with one or more of the first through eighteenth aspects, the C-WUS configuration information indicates multiple CSs, and multiplexing the C-WUS with the one or more information bits includes transmitting, via the one or more resources associated with the C-WUS monitoring occasion, the C-WUS and the one or more information bits using different respective CSs of the multiple CSs.

In a twentieth additional aspect, alone or in combination with one or more of the first through nineteenth aspects, the C-WUS configuration information indicates multiple uplink transmission power levels, and multiplexing the C-WUS with the one or more information bits includes transmitting, via the one or more resources associated with the C-WUS monitoring occasion, the C-WUS and the one or more information bits using different respective uplink transmission power levels of the multiple uplink transmission power levels.

In a twenty-first additional aspect, alone or in combination with one or more of the first through twentieth aspects, the one or more C-WUS resources include multiple RBs associated with the C-WUS monitoring occasion, and multiplexing the C-WUS with the one or more information bits includes transmitting the C-WUS and the one or more information bits via different respective RBs of the multiple RBs associated with the C-WUS monitoring occasion.

In a twenty-second additional aspect, alone or in combination with one or more of the first through twenty-first aspects, the C-WUS configuration information indicates multiple cell-specific sequences, and multiplexing the C-WUS with the one or more information bits includes transmitting, via the one or more resources associated with the C-WUS monitoring occasion, the C-WUS and the one or more information bits using different cell-specific sequences of the multiple cell-specific sequences.

In a twenty-third additional aspect, alone or in combination with one or more of the first through twenty-second aspects, the one or more C-WUS monitoring occasions include a first set of C-WUS monitoring occasions associated with transmission of the C-WUS without one or more additional information bits and a second set of C-WUS monitoring occasions associated with transmission of the C-WUS together with one or more additional information bits.

In a twenty-fourth additional aspect, alone or in combination with one or more of the first through twenty-third aspects, the C-WUS configuration information indicates a first C-WUS configuration associated with a first network energy state and a second C-WUS configuration associated with a second network energy state.

In a twenty-fifth additional aspect, alone or in combination with one or more of the first through twenty-fourth aspects, the first C-WUS configuration includes first C-WUS configuration information for a first set of C-WUS monitoring occasions associated with the first network energy state, the second C-WUS configuration includes second C-WUS configuration information for a second set of C-WUS monitoring occasions associated with the second network energy state, and the first set of C-WUS monitoring occasions includes a first quantity of C-WUS monitoring occasions, the second set of C-WUS monitoring occasions includes a second quantity of C-WUS monitoring occasions, and the first quantity is different than the second quantity.

In a twenty-sixth additional aspect, alone or in combination with one or more of the first through twenty-fifth aspects, the first C-WUS configuration indicates a first set of C-WUS resources for one or more first C-WUS monitoring occasions associated with the first network energy state, the second C-WUS configuration indicates a second set of C-WUS resources for one or more second C-WUS monitoring occasions associated with the second network energy state, and a first quantity C-WUS resources included in the first set of C-WUS resources is different than a second quantity of C-WUS resources included in the second set of C-WUS resources.

In a twenty-seventh additional aspect, alone or in combination with one or more of the first through twenty-sixth aspects, the C-WUS configuration information indicates the C-WUS triggering condition.

In a twenty-eighth additional aspect, alone or in combination with one or more of the first through twenty-seventh aspects, process 700 includes detecting that the C-WUS triggering condition is satisfied in connection with an uplink buffer size satisfying a threshold.

In a twenty-ninth additional aspect, alone or in combination with one or more of the first through twenty-eighth aspects, the threshold is at least one of associated with a network energy state of the network node, indicated in the C-WUS configuration information or a downlink communication received from the network node, associated with a priority of uplink traffic in an uplink buffer of the UE, or associated with at least one of a logical channel or a logical channel group.

In a thirtieth additional aspect, alone or in combination with one or more of the first through twenty-ninth aspects, process 700 includes detecting that the C-WUS triggering condition is satisfied in connection with an uplink latency being within a threshold of a packet delay budget.

In a thirty-first additional aspect, alone or in combination with one or more of the first through thirtieth aspects, process 700 includes detecting that the C-WUS triggering condition is satisfied in connection with detecting a drop in RSRP measurements of downlink reference signals that satisfies a threshold.

In a thirty-second additional aspect, alone or in combination with one or more of the first through thirty-first aspects, process 700 includes detecting that the C-WUS triggering condition is satisfied in connection with an energy level of the UE satisfying a threshold.

In a thirty-third additional aspect, alone or in combination with one or more of the first through thirty-second aspects, the energy level of the UE is associated with at least one of a charging rate profile of the UE, a discharging rate profile of the UE, or an energy state profile of the UE.

In a thirty-fourth additional aspect, alone or in combination with one or more of the first through thirty-third aspects, process 700 includes detecting that the C-WUS triggering condition is satisfied in connection with a discharging rate of the UE satisfying a threshold.

In a thirty-fifth additional aspect, alone or in combination with one or more of the first through thirty-fourth aspects, process 700 includes detecting that the C-WUS triggering condition is satisfied in connection with a mapping function or criterion associated with at least one of a charging rate profile of the UE, a discharging rate profile of the UE, or an energy state profile of the UE.

In a thirty-sixth additional aspect, alone or in combination with one or more of the first through thirty-fifth aspects, process 700 includes detecting whether the C-WUS triggering condition is satisfied responsive to triggering of a scheduling request or buffer status report.

In a thirty-seventh additional aspect, alone or in combination with one or more of the first through thirty-sixth aspects, process 700 includes refraining from transmitting another C-WUS in another C-WUS monitoring occasion in connection with detecting that the C-WUS triggering condition is not satisfied.

In a thirty-eighth additional aspect, alone or in combination with one or more of the first through thirty-seventh aspects, the one or more C-WUS monitoring occasions include a first set of C-WUS monitoring occasions associated with the C-WUS triggering condition being satisfied, the C-WUS configuration information indicates a null resource set associated with a second set of C-WUS monitoring occasions associated with the C-WUS triggering condition not being satisfied, and refraining from transmitting the other C-WUS in the other C-WUS monitoring occasion includes refraining from transmitting the other C-WUS in the other C-WUS monitoring occasion in connection with the null resource set being associated with the other C-WUS monitoring occasion.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
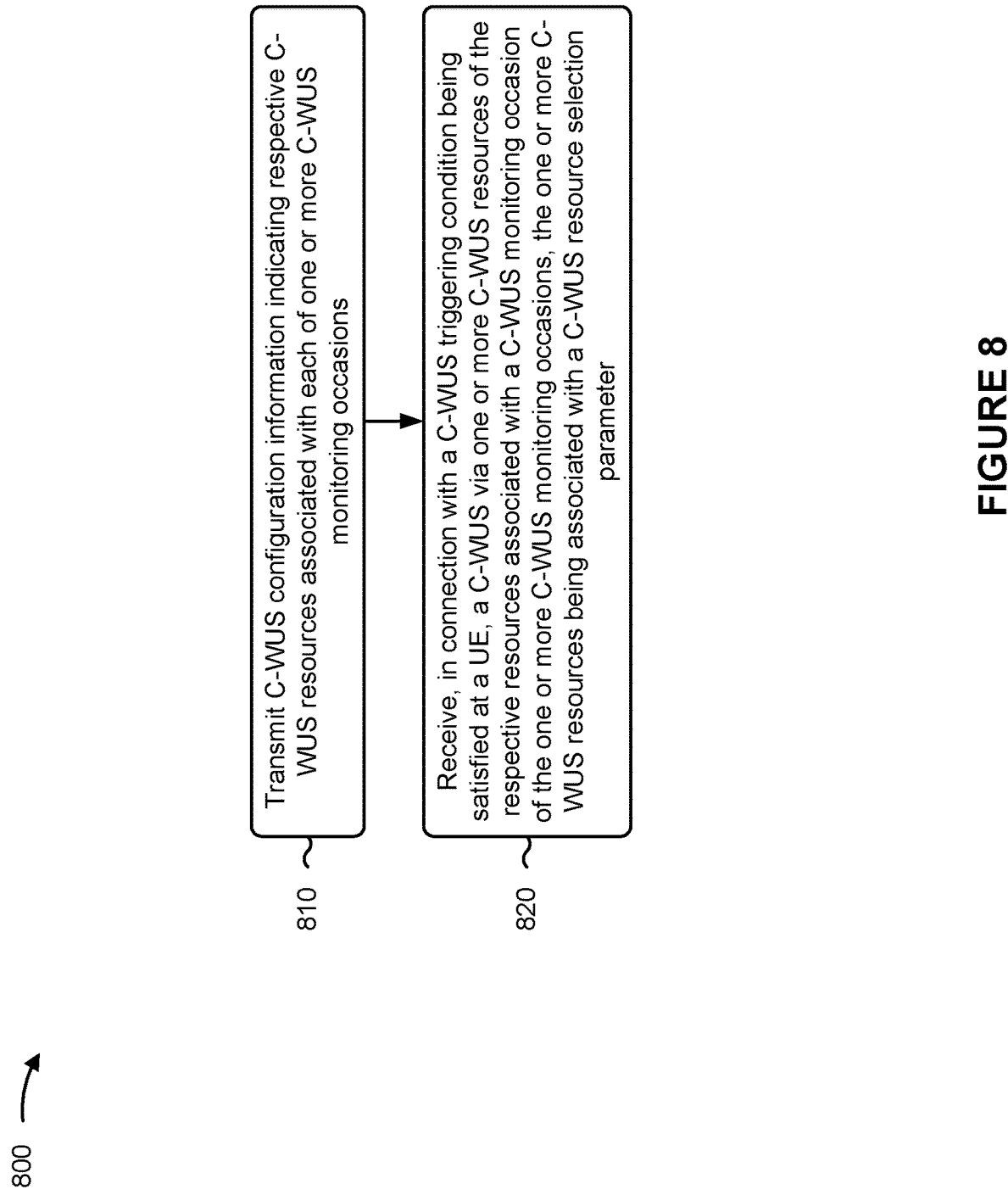
FIG. 8 is a flowchart illustrating an example process performed, for example, by a network node that supports C-WUS triggering and resource selection in accordance with the present disclosure.

FIG. 8 is a flowchart illustrating an example process 800 performed, for example, by a network node that supports C-WUS triggering and resource selection in accordance with the present disclosure. Example process 800 is an example where the network node (for example, network node 110) performs operations associated with C-WUS triggering and resource selection.

As shown in FIG. 8, in some aspects, process 800 may include transmitting C-WUS configuration information indicating respective C-WUS resources associated with each of one or more C-WUS monitoring occasions (block 810). For example, the network node (such as by using communication manager 150 or transmission component 1004, depicted in FIG. 10) may transmit C-WUS configuration information indicating respective C-WUS resources associated with each of one or more C-WUS monitoring occasions, as described above.

As further shown in FIG. 8, in some aspects, process 800 may include receiving, in connection with a C-WUS triggering condition being satisfied at a UE, a C-WUS via one or more C-WUS resources of the respective resources associated with a C-WUS monitoring occasion of the one or more C-WUS monitoring occasions, the one or more C-WUS resources being associated with a C-WUS resource selection parameter (block 820). For example, the network node (such as by using communication manager 150 or reception component 1002, depicted in FIG. 10) may receive, in connection with a C-WUS triggering condition being satisfied at a UE, a C-WUS via one or more C-WUS resources of the respective resources associated with a C-WUS monitoring occasion of the one or more C-WUS monitoring occasions, the one or more C-WUS resources being associated with a C-WUS resource selection parameter, as described above.

Process 800 may include additional aspects, such as any single aspect or any combination of aspects described below or in connection with one or more other processes described elsewhere herein.

In a first additional aspect, the respective resources associated with each of the one or more C-WUS monitoring occasions are PUCCH resources.

In a second additional aspect, alone or in combination with the first aspect, the C-WUS configuration information indicates a cell-specific sequence for the C-WUS and one or more cyclic shifts, and receiving the C-WUS includes receiving, via the one or more C-WUS resources, the cell-specific sequence with a cyclic shift of the one or more cyclic shifts.

In a third additional aspect, alone or in combination with one or more of the first and second aspects, the C-WUS configuration information is included in at least one of an RRC message, a MAC-CE, or DCI.

In a fourth additional aspect, alone or in combination with one or more of the first through third aspects, the C-WUS configuration information is included in at least one of an MIB, an SIB1, or another SIB.

In a fifth additional aspect, alone or in combination with one or more of the first through fourth aspects, the respective C-WUS resources associated with each of the one or more C-WUS monitoring occasions include one or more respective RBs associated with each of the one or more C-WUS monitoring occasions, and the one or more C-WUS resources include at least one RB from the one or more respective RBs associated with the C-WUS monitoring occasion.

In a sixth additional aspect, alone or in combination with one or more of the first through fifth aspects, the C-WUS configuration information indicates the C-WUS resource selection parameter to be used for selecting the one or more C-WUS resources.

In a seventh additional aspect, alone or in combination with one or more of the first through sixth aspects, the C-WUS resource selection parameter is a scrambling ID, and the scrambling ID is indicated in the C-WUS configuration information.

In an eighth additional aspect, alone or in combination with one or more of the first through seventh aspects, the C-WUS resource selection parameter is a cell-specific sequence for the C-WUS, and the cell-specific sequence is indicated in the C-WUS configuration information.

In a ninth additional aspect, alone or in combination with one or more of the first through eighth aspects, the C-WUS resource selection parameter is a UE ID associated with the UE.

In a tenth additional aspect, alone or in combination with one or more of the first through ninth aspects, the C-WUS resource selection parameter is a UE group ID associated with a group of UEs including the UE.

In an eleventh additional aspect, alone or in combination with one or more of the first through tenth aspects, the C-WUS resource selection parameter is a latest SSB index or CSI-RS index indicated by the UE to the network node.

In a twelfth additional aspect, alone or in combination with one or more of the first through eleventh aspects, the C-WUS resource selection parameter is an SSB index selected by the UE.

In a thirteenth additional aspect, alone or in combination with one or more of the first through twelfth aspects, the C-WUS resource selection parameter is an index of a reference signal associated with a WUR of the UE.

In a fourteenth additional aspect, alone or in combination with one or more of the first through thirteenth aspects, the reference signal is an LP-SS associated with synchronization of the WUR of the UE or an LP-RS associated with an RRM measurement performed by the WUR of the UE.

In a fifteenth additional aspect, alone or in combination with one or more of the first through fourteenth aspects, the C-WUS resource selection parameter is at least one of a class or type of the UE, a class or type of a WUR of the UE, or a class or type of an MR of the UE.

In a sixteenth additional aspect, alone or in combination with one or more of the first through fifteenth aspects, the C-WUS resource selection parameter is associated with a network energy state of the network node.

In a seventeenth additional aspect, alone or in combination with one or more of the first through sixteenth aspects, receiving the C-WUS includes receiving the C-WUS multiplexed with one or more information bits in the one or more C-WUS resources associated with the C-WUS monitoring occasion.

In an eighteenth additional aspect, alone or in combination with one or more of the first through seventeenth aspects, the C-WUS configuration information indicates multiple CSs, and the C-WUS and the one or more information bits are associated with different respective CSs of the multiple CSs.

In a nineteenth additional aspect, alone or in combination with one or more of the first through eighteenth aspects, the C-WUS configuration information indicates multiple uplink transmission power levels, and the C-WUS and the one or more information bits are associated with different respective uplink transmission power levels of the multiple uplink transmission power levels.

In a twentieth additional aspect, alone or in combination with one or more of the first through nineteenth aspects, the one or more C-WUS resources include multiple RBs associated with the C-WUS monitoring occasion, and receiving the C-WUS multiplexed with the one or more information bits includes receiving the C-WUS and the one or more information bits via different respective RBs of the multiple RBs associated with the C-WUS monitoring occasion.

In a twenty-first additional aspect, alone or in combination with one or more of the first through twentieth aspects, the C-WUS configuration information indicates multiple cell-specific sequences, and the C-WUS and the one or more information bits are associated with different cell-specific sequences of the multiple cell-specific sequences.

In a twenty-second additional aspect, alone or in combination with one or more of the first through twenty-first aspects, the one or more C-WUS monitoring occasions include a first set of C-WUS monitoring occasions associated with transmission of the C-WUS without one or more additional information bits and a second set of C-WUS monitoring occasions associated with transmission of the C-WUS together with one or more additional information bits.

In a twenty-third additional aspect, alone or in combination with one or more of the first through twenty-second aspects, the C-WUS configuration information indicates a first C-WUS configuration associated with a first network energy state and a second C-WUS configuration associated with a second network energy state.

In a twenty-fourth additional aspect, alone or in combination with one or more of the first through twenty-third aspects, the first C-WUS configuration includes first C-WUS configuration information for a first set of C-WUS monitoring occasions associated with the first network energy state, the second C-WUS configuration includes second C-WUS configuration information for a second set of C-WUS monitoring occasions associated with the second network energy state, and the first set of C-WUS monitoring occasions includes a first quantity of C-WUS monitoring occasions, the second set of C-WUS monitoring occasions includes a second quantity of C-WUS monitoring occasions, and the first quantity is different than the second quantity.

In a twenty-fifth additional aspect, alone or in combination with one or more of the first through twenty-fourth aspects, the first C-WUS configuration indicates a first set of C-WUS resources for one or more first C-WUS monitoring occasions associated with the first network energy state, the second C-WUS configuration indicates a second set of C-WUS resources for one or more second C-WUS monitoring occasions associated with the second network energy state, and a first quantity C-WUS resources included in the first set of C-WUS resources is different than a second quantity of C-WUS resources included in the second set of C-WUS resources.

In a twenty-sixth additional aspect, alone or in combination with one or more of the first through twenty-fifth aspects, the C-WUS configuration information indicates the C-WUS triggering condition.

In a twenty-seventh additional aspect, alone or in combination with one or more of the first through twenty-sixth aspects, the C-WUS triggering condition is satisfied in connection with an uplink buffer size of the UE satisfying a threshold.

In a twenty-eighth additional aspect, alone or in combination with one or more of the first through twenty-seventh aspects, the threshold is at least one of associated with a network energy state of the network node, indicated in the C-WUS configuration information or a downlink communication transmitted by the network node, associated with a priority of uplink traffic in an uplink buffer of the UE, or associated with at least one of a logical channel or a logical channel group.

In a twenty-ninth additional aspect, alone or in combination with one or more of the first through twenty-eighth aspects, the C-WUS triggering condition is satisfied in connection with an uplink latency associated with the UE being within a threshold of a packet delay budget.

In a thirtieth additional aspect, alone or in combination with one or more of the first through twenty-ninth aspects, the C-WUS triggering condition is satisfied in connection with a drop in RSRP measurements of downlink reference signals satisfying a threshold.

In a thirty-first additional aspect, alone or in combination with one or more of the first through thirtieth aspects, the C-WUS triggering condition is satisfied in connection with an energy level of the UE satisfying a threshold.

In a thirty-second additional aspect, alone or in combination with one or more of the first through thirty-first aspects, the energy level of the UE is associated with at least one of a charging rate profile of the UE, a discharging rate profile of the UE, or an energy state profile of the UE.

In a thirty-third additional aspect, alone or in combination with one or more of the first through thirty-second aspects, the C-WUS triggering condition is satisfied in connection with a discharging rate of the UE satisfying a threshold.

In a thirty-fourth additional aspect, alone or in combination with one or more of the first through thirty-third aspects, the C-WUS triggering condition is satisfied in connection with a mapping function or criterion associated with at least one of a charging rate profile of the UE, a discharging rate profile of the UE, or an energy state profile of the UE.

In a thirty-fifth additional aspect, alone or in combination with one or more of the first through thirty-fourth aspects, the one or more C-WUS monitoring occasions include a first set of C-WUS monitoring occasions associated with the C-WUS triggering condition being satisfied, and the C-WUS configuration information indicates a null resource set associated with a second set of C-WUS monitoring occasions associated with the C-WUS triggering condition not being satisfied.

In a thirty-sixth additional aspect, alone or in combination with one or more of the first through thirty-fifth aspects, process 800 includes switching from a first network energy state to a second network energy state in connection with receiving the C-WUS.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
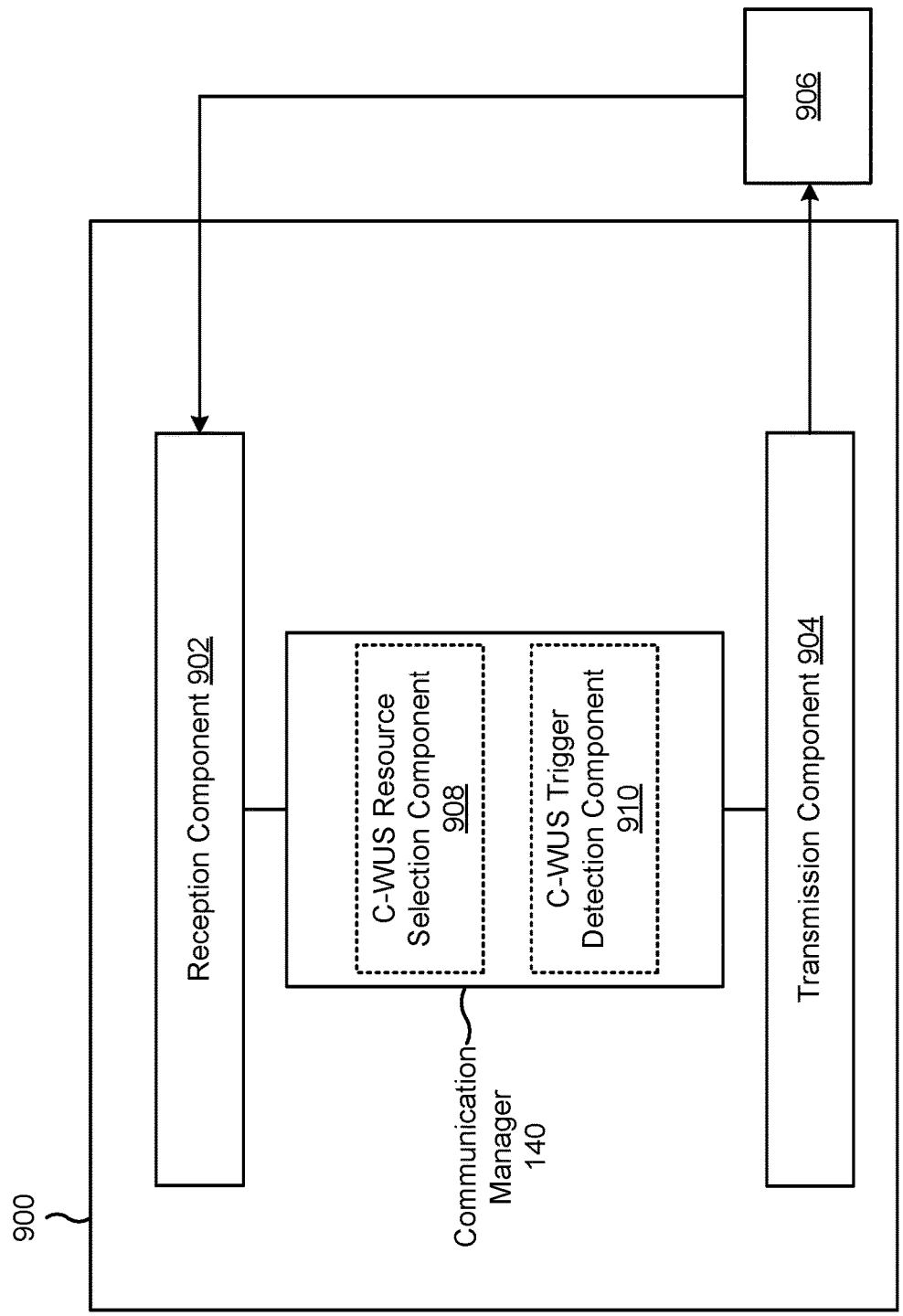
FIGS. 9-10 are diagrams example apparatuses for wireless communication that support C-WUS triggering and resource selection in accordance with the present disclosure.

FIG. 9 is a diagram of an example apparatus 900 for wireless communication that supports C-WUS triggering and resource selection in accordance with the present disclosure. The apparatus 900 may be a UE, or a UE may include the apparatus 900. In some aspects, the apparatus 900 includes a reception component 902, a transmission component 904, and a communication manager 140, which may be in communication with one another (for example, via one or more buses). As shown, the apparatus 900 may communicate with another apparatus 906 (such as a UE, a network node, or another wireless communication device) using the reception component 902 and the transmission component 904.

In some aspects, the apparatus 900 may be configured to and/or operable to perform one or more operations described herein in connection with FIGS. 5 and 6A-6B. Additionally or alternatively, the apparatus 900 may be configured to and/or operable to perform one or more processes described herein, such as process 700 of FIG. 7. In some aspects, the apparatus 900 may include one or more components of the UE described above in connection with FIG. 2.

The reception component 902 may receive communications, such as reference signals, control information, and/or data communications, from the apparatus 906. The reception component 902 may provide received communications to one or more other components of the apparatus 900, such as the communication manager 140. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a modem, a demodulator, a MIMO detector, a receive processor, a controller/processor, and/or a memory of the UE described above in connection with FIG. 2.

The transmission component 904 may transmit communications, such as reference signals, control information, and/or data communications, to the apparatus 906. In some aspects, the communication manager 140 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, and/or a memory of the UE described above in connection with FIG. 2. In some aspects, the transmission component 904 may be co-located with the reception component 902 in a transceiver.

The communication manager 140 may receive or may cause the reception component 902 to receive, from a network node, C-WUS configuration information indicating respective C-WUS resources associated with each of one or more C-WUS monitoring occasions. The communication manager 140 may transmit or may cause the transmission component 904 to transmit, to the network node and in connection with a C-WUS triggering condition being satisfied, a C-WUS via one or more C-WUS resources of the respective C-WUS resources associated with a C-WUS monitoring occasion of the one or more C-WUS monitoring occasions, the one or more C-WUS resources being associated with a C-WUS resource selection parameter. In some aspects, the communication manager 140 may perform one or more operations described elsewhere herein as being performed by one or more components of the communication manager 140.

The communication manager 140 may include a controller/processor and/or a memory of the UE described above in connection with FIG. 2. In some aspects, the communication manager 140 includes a set of components, such as a C-WUS resource selection component 908, and/or a C-WUS trigger detection component 910. Alternatively, the set of components may be separate and distinct from the communication manager 140. In some aspects, one or more components of the set of components may include or may be implemented within a controller/processor and/or a memory of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive, from a network node, C-WUS configuration information indicating respective C-WUS resources associated with each of one or more C-WUS monitoring occasions. The transmission component 904 may transmit, to the network node and in connection with a C-WUS triggering condition being satisfied, a C-WUS via one or more C-WUS resources of the respective C-WUS resources associated with a C-WUS monitoring occasion of the one or more C-WUS monitoring occasions, the one or more C-WUS resources being associated with a C-WUS resource selection parameter.

The C-WUS resource selection component 908 may select the one or more C-WUS resources in association with the C-WUS resource selection parameter.

The C-WUS trigger detection component 910 may detect that the C-WUS triggering condition is satisfied in connection with an uplink buffer size satisfying a threshold.

The C-WUS trigger detection component 910 may detect that the C-WUS triggering condition is satisfied in connection with an uplink latency being within a threshold of a packet delay budget.

The C-WUS trigger detection component 910 may detect that the C-WUS triggering condition is satisfied in connection with detecting a drop in RSRP measurements of downlink reference signals that satisfies a threshold.

The C-WUS trigger detection component 910 may detect that the C-WUS triggering condition is satisfied in connection with an energy level of the UE satisfying a threshold.

The C-WUS trigger detection component 910 may detect that the C-WUS triggering condition is satisfied in connection with a discharging rate of the UE satisfying a threshold.

The C-WUS trigger detection component 910 may detect that the C-WUS triggering condition is satisfied in connection with a mapping function or criterion associated with at least one of a charging rate profile of the UE, a discharging rate profile of the UE, or an energy state profile of the UE.

The C-WUS trigger detection component 910 may detect whether the C-WUS triggering condition is satisfied responsive to triggering of a scheduling request or buffer status report.

The transmission component 904 and/or the communication manager 140 may refrain from transmitting another C-WUS in another C-WUS monitoring occasion in connection with detecting that the C-WUS triggering condition is not satisfied.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
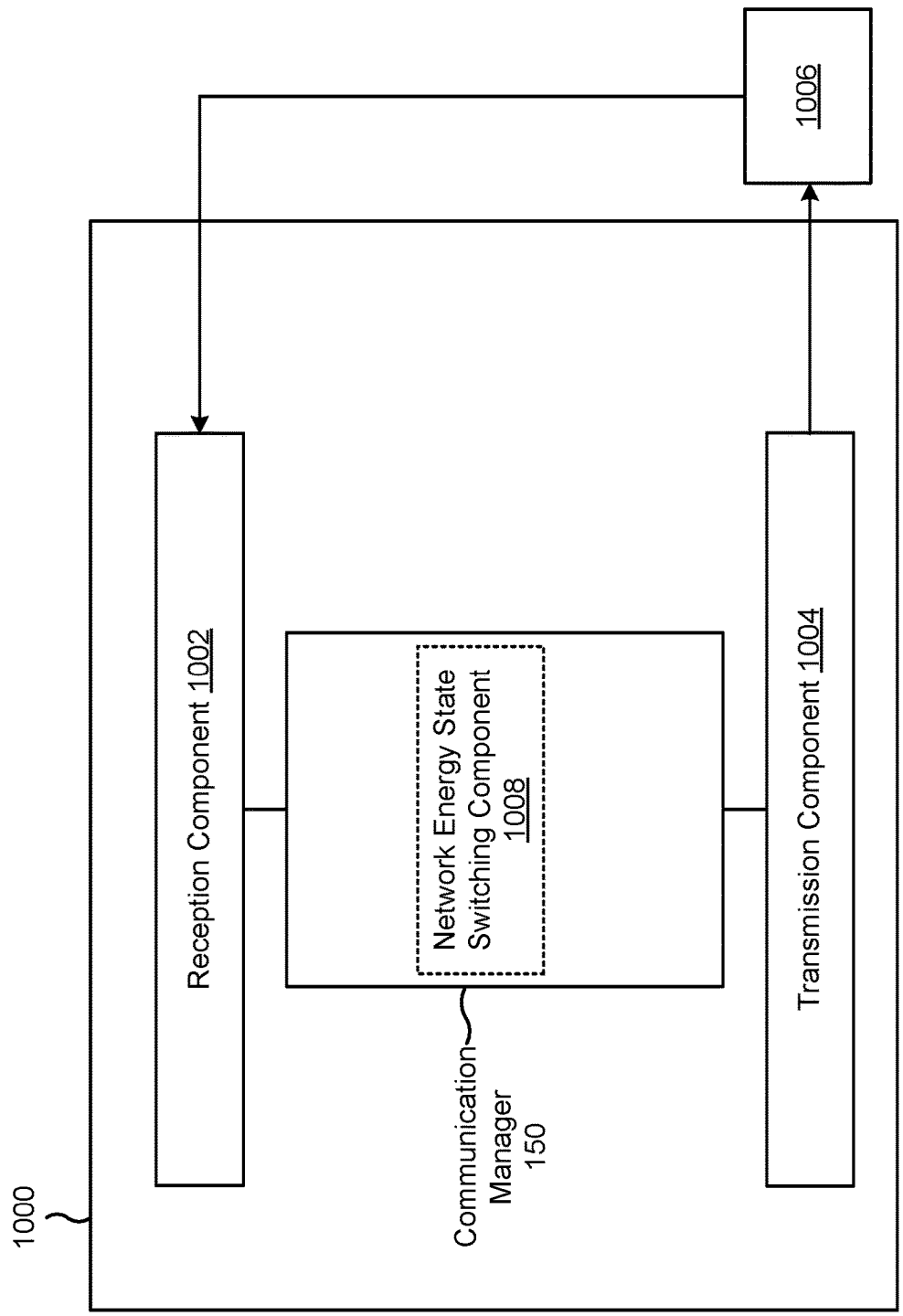

FIG. 10 is a diagram of an example apparatus 1000 for wireless communication that supports C-WUS triggering and resource selection in accordance with the present disclosure. The apparatus 1000 may be a network node, or a network node may include the apparatus 1000. In some aspects, the apparatus 1000 includes a reception component 1002, a transmission component 1004, and a communication manager 150, which may be in communication with one another (for example, via one or more buses). As shown, the apparatus 1000 may communicate with another apparatus 1006 (such as a UE, a network node, or another wireless communication device) using the reception component 1002 and the transmission component 1004.

In some aspects, the apparatus 1000 may be configured to and/or operable to perform one or more operations described herein in connection with FIGS. 5 and 6A-6B. Additionally or alternatively, the apparatus 1000 may be configured to and/or operable to perform one or more processes described herein, such as process 800 of FIG. 8. In some aspects, the apparatus 1000 may include one or more components of the network node described above in connection with FIG. 2.

The reception component 1002 may receive communications, such as reference signals, control information, and/or data communications, from the apparatus 1006. The reception component 1002 may provide received communications to one or more other components of the apparatus 1000, such as the communication manager 150. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a modem, a demodulator, a MIMO detector, a receive processor, a controller/processor, and/or a memory of the network node described above in connection with FIG. 2.

The transmission component 1004 may transmit communications, such as reference signals, control information, and/or data communications, to the apparatus 1006. In some aspects, the communication manager 150 may generate communications and may transmit the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, and/or a memory of the network node described above in connection with FIG. 2. In some aspects, the transmission component 1004 may be co-located with the reception component 1002 in a transceiver.

The communication manager 150 may transmit or may cause the transmission component 1004 to transmit C-WUS configuration information indicating respective C-WUS resources associated with each of one or more C-WUS monitoring occasions. The communication manager 150 may receive or may cause the reception component 1002 to receive, in connection with a C-WUS triggering condition being satisfied at a UE, a C-WUS via one or more C-WUS resources of the respective resources associated with a C-WUS monitoring occasion of the one or more C-WUS monitoring occasions, the one or more C-WUS resources being associated with a C-WUS resource selection parameter. In some aspects, the communication manager 150 may perform one or more operations described elsewhere herein as being performed by one or more components of the communication manager 150.

The communication manager 150 may include a controller/processor, a memory, a scheduler, and/or a communication unit of the network node described above in connection with FIG. 2. In some aspects, the communication manager 150 includes a set of components, such as a network energy state switching component 1008. Alternatively, the set of components may be separate and distinct from the communication manager 150. In some aspects, one or more components of the set of components may include or may be implemented within a controller/processor, a memory, a scheduler, and/or a communication unit of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1004 may transmit C-WUS configuration information indicating respective C-WUS resources associated with each of one or more C-WUS monitoring occasions. The reception component 1002 may receive, in connection with a C-WUS triggering condition being satisfied at a UE, a C-WUS via one or more C-WUS resources of the respective resources associated with a C-WUS monitoring occasion of the one or more C-WUS monitoring occasions, the one or more C-WUS resources being associated with a C-WUS resource selection parameter.

The network energy state switching component 1008 may switch from a first network energy state to a second network energy state in connection with receiving the C-WUS.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from a network node, cell wake-up signal (C-WUS) configuration information indicating respective C-WUS resources associated with each of one or more C-WUS monitoring occasions; and transmitting, to the network node and in connection with a C-WUS triggering condition being satisfied, a C-WUS via one or more C-WUS resources of the respective C-WUS resources associated with a C-WUS monitoring occasion of the one or more C-WUS monitoring occasions, the one or more C-WUS resources being associated with a C-WUS resource selection parameter.

Aspect 2: The method of Aspect 1, wherein the respective resources associated with each of the one or more C-WUS monitoring occasions are physical uplink control channel (PUCCH) resources.

Aspect 3: The method of any of Aspects 1-2, wherein the C-WUS configuration information indicates a cell-specific sequence for the C-WUS and one or more cyclic shifts, and wherein transmitting the C-WUS comprises: transmitting, via the one or more C-WUS resources, the cell-specific sequence with a cyclic shift of the one or more cyclic shifts.

Aspect 4: The method of any of Aspects 1-3, wherein the C-WUS configuration information is included in at least one of a radio resource control (RRC) message, a medium access control (MAC) control element (MAC-CE), or downlink control information (DCI).

Aspect 5: The method of any of Aspects 1-4, wherein the C-WUS configuration information is included in at least one of a master information block (MIB), a system information block (SIB) type 1 (SIB1), or another SIB.

Aspect 6: The method of any of Aspects 1-5, further comprising: selecting the one or more C-WUS resources in association with the C-WUS resource selection parameter.

Aspect 7: The method of Aspect 6, wherein the respective C-WUS resources associated with each of the one or more C-WUS monitoring occasions include one or more respective resource blocks (RBs) associated with each of the one or more C-WUS monitoring occasions, and wherein selecting the one or more C-WUS resources comprises: selecting at least one RB from the one or more respective RBs associated with the C-WUS monitoring occasion in association with the C-WUS resource selection parameter.

Aspect 8: The method of any of Aspects 1-7, wherein the C-WUS configuration information indicates the C-WUS resource selection parameter to be used for selecting the one or more C-WUS resources.

Aspect 9: The method of any of Aspects 1-8, wherein the C-WUS resource selection parameter is a scrambling identifier (ID), and wherein the scrambling ID is indicated in the C-WUS configuration information.

Aspect 10: The method of any of Aspects 1-9, wherein the C-WUS resource selection parameter is a cell-specific sequence for the C-WUS, and wherein the cell-specific sequence is indicated in the C-WUS configuration information.

Aspect 11: The method of any of Aspects 1-10, wherein the C-WUS resource selection parameter is a UE identifier (ID) associated with the UE.

Aspect 12: The method of any of Aspects 1-11, wherein the C-WUS resource selection parameter is a UE group identifier (ID) associated with a group of UEs including the UE.

Aspect 13: The method of any of Aspects 1-12, wherein the C-WUS resource selection parameter is a latest synchronization signal block (SSB) index or channel state information reference signal (CSI-RS) index indicated by the UE to the network node.

Aspect 14: The method of any of Aspects 1-13, wherein the C-WUS resource selection parameter is a synchronization signal block (SSB) index selected by the UE.

Aspect 15: The method of any of Aspects 1-14, wherein the C-WUS resource selection parameter is an index of a reference signal associated with a wake-up radio (WUR) of the UE.

Aspect 16: The method of Aspect 15, wherein the reference signal is a low power synchronization signal (LP-SS) associated with synchronization of the WUR of the UE or a low power reference signal (LP-RS) associated with a radio resource management (RRM) measurement performed by the WUR of the UE.

Aspect 17: The method of any of Aspects 1-16, wherein the C-WUS resource selection parameter is at least one of a class or type of the UE, a class or type of a wake-up radio (WUR) of the UE, or a class or type of a main radio (MR) of the UE.

Aspect 18: The method of any of Aspects 1-17, wherein the C-WUS resource selection parameter is associated with a network energy state of the network node.

Aspect 19: The method of any of Aspects 1-18, wherein transmitting the C-WUS comprises: multiplexing the C-WUS with one or more information bits in the one or more C-WUS resources associated with the C-WUS monitoring occasion.

Aspect 20: The method of Aspect 19, wherein the C-WUS configuration information indicates multiple cyclic shifts (CSs), and wherein multiplexing the C-WUS with the one or more information bits comprises: transmitting, via the one or more resources associated with the C-WUS monitoring occasion, the C-WUS and the one or more information bits using different respective CSs of the multiple CSs.

Aspect 21: The method of any of Aspects 19-20, wherein the C-WUS configuration information indicates multiple uplink transmission power levels, and wherein multiplexing the C-WUS with the one or more information bits comprises: transmitting, via the one or more resources associated with the C-WUS monitoring occasion, the C-WUS and the one or more information bits using different respective uplink transmission power levels of the multiple uplink transmission power levels.

Aspect 22: The method of any of Aspects 19-21, wherein the one or more C-WUS resources include multiple resource blocks (RBs) associated with the C-WUS monitoring occasion, and wherein multiplexing the C-WUS with the one or more information bits comprises: transmitting the C-WUS and the one or more information bits via different respective RBs of the multiple RBs associated with the C-WUS monitoring occasion.

Aspect 23: The method of any of Aspects 19-22, wherein the C-WUS configuration information indicates multiple cell-specific sequences, and wherein multiplexing the C-WUS with the one or more information bits comprises: transmitting, via the one or more resources associated with the C-WUS monitoring occasion, the C-WUS and the one or more information bits using different cell-specific sequences of the multiple cell-specific sequences.

Aspect 24: The method of any of Aspects 1-23, wherein the one or more C-WUS monitoring occasions include a first set of C-WUS monitoring occasions associated with transmission of the C-WUS without one or more additional information bits and a second set of C-WUS monitoring occasions associated with transmission of the C-WUS together with one or more additional information bits.

Aspect 25: The method of any of Aspects 1-24, wherein the C-WUS configuration information indicates a first C-WUS configuration associated with a first network energy state and a second C-WUS configuration associated with a second network energy state.

Aspect 26: The method of Aspect 25, wherein the first C-WUS configuration includes first C-WUS configuration information for a first set of C-WUS monitoring occasions associated with the first network energy state, wherein the second C-WUS configuration includes second C-WUS configuration information for a second set of C-WUS monitoring occasions associated with the second network energy state, and wherein the first set of C-WUS monitoring occasions includes a first quantity of C-WUS monitoring occasions, the second set of C-WUS monitoring occasions includes a second quantity of C-WUS monitoring occasions, and the first quantity is different than the second quantity.

Aspect 27: The method of any of Aspects 25-26, wherein the first C-WUS configuration indicates a first set of C-WUS resources for one or more first C-WUS monitoring occasions associated with the first network energy state, wherein the second C-WUS configuration indicates a second set of C-WUS resources for one or more second C-WUS monitoring occasions associated with the second network energy state, and wherein a first quantity C-WUS resources included in the first set of C-WUS resources is different than a second quantity of C-WUS resources included in the second set of C-WUS resources.

Aspect 28: The method of any of Aspects 1-27, wherein the C-WUS configuration information indicates the C-WUS triggering condition.

Aspect 29: The method of any of Aspects 1-28, further comprising: detecting that the C-WUS triggering condition is satisfied in connection with an uplink buffer size satisfying a threshold.

Aspect 30: The method of Aspect 29, wherein the threshold is at least one of: associated with a network energy state of the network node, indicated in the C-WUS configuration information or a downlink communication received from the network node, associated with a priority of uplink traffic in an uplink buffer of the UE, or associated with at least one of a logical channel or a logical channel group.

Aspect 31: The method of any of Aspects 1-30, further comprising: detecting that the C-WUS triggering condition is satisfied in connection with an uplink latency being within a threshold of a packet delay budget.

Aspect 32: The method of any of Aspects 1-31, further comprising: detecting that the C-WUS triggering condition is satisfied in connection with detecting a drop in reference signal received power (RSRP) measurements of downlink reference signals that satisfies a threshold.

Aspect 33: The method of any of Aspects 1-32, further comprising: detecting that the C-WUS triggering condition is satisfied in connection with an energy level of the UE satisfying a threshold.

Aspect 34: The method of Aspect 33, wherein the energy level of the UE is associated with at least one of a charging rate profile of the UE, a discharging rate profile of the UE, or an energy state profile of the UE.

Aspect 35: The method of any of Aspects 1-34, further comprising: detecting that the C-WUS triggering condition is satisfied in connection with a discharging rate of the UE satisfying a threshold.

Aspect 36: The method of any of Aspects 1-35, further comprising: detecting that the C-WUS triggering condition is satisfied in connection with a mapping function or criterion associated with at least one of a charging rate profile of the UE, a discharging rate profile of the UE, or an energy state profile of the UE.

Aspect 37: The method of any of Aspects 1-36, further comprising: detecting whether the C-WUS triggering condition is satisfied responsive to triggering of a scheduling request or buffer status report.

Aspect 38: The method of Aspect 37, further comprising: refraining from transmitting another C-WUS in another C-WUS monitoring occasion in connection with detecting that the C-WUS triggering condition is not satisfied.

Aspect 39: The method of Aspect 38, wherein the one or more C-WUS monitoring occasions include a first set of C-WUS monitoring occasions associated with the C-WUS triggering condition being satisfied, wherein the C-WUS configuration information indicates a null resource set associated with a second set of C-WUS monitoring occasions associated with the C-WUS triggering condition not being satisfied, and wherein refraining from transmitting the other C-WUS in the other C-WUS monitoring occasion comprises: refraining from transmitting the other C-WUS in the other C-WUS monitoring occasion in connection with the null resource set being associated with the other C-WUS monitoring occasion.

Aspect 40: A method of wireless communication performed by a network node, comprising: transmitting cell wake-up signal (C-WUS) configuration information indicating respective C-WUS resources associated with each of one or more C-WUS monitoring occasions; and receiving, in connection with a C-WUS triggering condition being satisfied at a UE, a C-WUS via one or more C-WUS resources of the respective resources associated with a C-WUS monitoring occasion of the one or more C-WUS monitoring occasions, the one or more C-WUS resources being associated with a C-WUS resource selection parameter.

Aspect 41: The method of Aspect 40, wherein the respective resources associated with each of the one or more C-WUS monitoring occasions are physical uplink control channel (PUCCH) resources.

Aspect 42: The method of any of Aspects 40-41, wherein the C-WUS configuration information indicates a cell-specific sequence for the C-WUS and one or more cyclic shifts, and wherein receiving the C-WUS comprises: receiving, via the one or more C-WUS resources, the cell-specific sequence with a cyclic shift of the one or more cyclic shifts.

Aspect 43: The method of any of Aspects 40-42, wherein the C-WUS configuration information is included in at least one of a radio resource control (RRC) message, a medium access control (MAC) control element (MAC-CE), or downlink control information (DCI).

Aspect 44: The method of any of Aspects 40-43, wherein the C-WUS configuration information is included in at least one of a master information block (MIB), a system information block (SIB) type 1 (SIB1), or another SIB.

Aspect 45: The method of any of Aspects 40-44, wherein the respective C-WUS resources associated with each of the one or more C-WUS monitoring occasions include one or more respective resource blocks (RBs) associated with each of the one or more C-WUS monitoring occasions, and wherein the one or more C-WUS resources include at least one RB from the one or more respective RBs associated with the C-WUS monitoring occasion.

Aspect 46: The method of any of Aspects 40-45, wherein the C-WUS configuration information indicates the C-WUS resource selection parameter to be used for selecting the one or more C-WUS resources.

Aspect 47: The method of any of Aspects 40-46, wherein the C-WUS resource selection parameter is a scrambling identifier (ID), and wherein the scrambling ID is indicated in the C-WUS configuration information.

Aspect 48: The method of any of Aspects 40-47, wherein the C-WUS resource selection parameter is a cell-specific sequence for the C-WUS, and wherein the cell-specific sequence is indicated in the C-WUS configuration information.

Aspect 49: The method of any of Aspects 40-48, wherein the C-WUS resource selection parameter is a UE identifier (ID) associated with the UE.

Aspect 50: The method of any of Aspects 40-49, wherein the C-WUS resource selection parameter is a UE group identifier (ID) associated with a group of UEs including the UE.

Aspect 51: The method of any of Aspects 40-50, wherein the C-WUS resource selection parameter is a latest synchronization signal block (SSB) index or channel state information reference signal (CSI-RS) index indicated by the UE to the network node.

Aspect 52: The method of any of Aspects 40-51, wherein the C-WUS resource selection parameter is a synchronization signal block (SSB) index selected by the UE.

Aspect 53: The method of any of Aspects 40-52, wherein the C-WUS resource selection parameter is an index of a reference signal associated with a wake-up radio (WUR) of the UE.

Aspect 54: The method of Aspect 53, wherein the reference signal is a low power synchronization signal (LP-SS) associated with synchronization of the WUR of the UE or a low power reference signal (LP-RS) associated with a radio resource management (RRM) measurement performed by the WUR of the UE.

Aspect 55: The method of any of Aspects 40-54, wherein the C-WUS resource selection parameter is at least one of a class or type of the UE, a class or type of a wake-up radio (WUR) of the UE, or a class or type of a main radio (MR) of the UE.

Aspect 56: The method of any of Aspects 40-55, wherein the C-WUS resource selection parameter is associated with a network energy state of the network node.

Aspect 57: The method of any of Aspects 40-56, wherein receiving the C-WUS comprises: receiving the C-WUS multiplexed with one or more information bits in the one or more C-WUS resources associated with the C-WUS monitoring occasion.

Aspect 58: The method of Aspect 57, wherein the C-WUS configuration information indicates multiple cyclic shifts (CSs), and wherein the C-WUS and the one or more information bits are associated with different respective CSs of the multiple CSs.

Aspect 59: The method of any of Aspects 57-58, wherein the C-WUS configuration information indicates multiple uplink transmission power levels, and wherein the C-WUS and the one or more information bits are associated with different respective uplink transmission power levels of the multiple uplink transmission power levels.

Aspect 60: The method of any of Aspects 57-59, wherein the one or more C-WUS resources include multiple resource blocks (RBs) associated with the C-WUS monitoring occasion, and wherein receiving the C-WUS multiplexed with the one or more information bits comprises: receiving the C-WUS and the one or more information bits via different respective RBs of the multiple RBs associated with the C-WUS monitoring occasion.

Aspect 61: The method of any of Aspects 57-60, wherein the C-WUS configuration information indicates multiple cell-specific sequences, and wherein the C-WUS and the one or more information bits are associated with different cell-specific sequences of the multiple cell-specific sequences.

Aspect 62: The method of any of Aspects 40-61, wherein the one or more C-WUS monitoring occasions include a first set of C-WUS monitoring occasions associated with transmission of the C-WUS without one or more additional information bits and a second set of C-WUS monitoring occasions associated with transmission of the C-WUS together with one or more additional information bits.

Aspect 63: The method of any of Aspects 40-62, wherein the C-WUS configuration information indicates a first C-WUS configuration associated with a first network energy state and a second C-WUS configuration associated with a second network energy state.

Aspect 64: The method of Aspect 63, wherein the first C-WUS configuration includes first C-WUS configuration information for a first set of C-WUS monitoring occasions associated with the first network energy state, wherein the second C-WUS configuration includes second C-WUS configuration information for a second set of C-WUS monitoring occasions associated with the second network energy state, and wherein the first set of C-WUS monitoring occasions includes a first quantity of C-WUS monitoring occasions, the second set of C-WUS monitoring occasions includes a second quantity of C-WUS monitoring occasions, and the first quantity is different than the second quantity.

Aspect 65: The method of any of Aspects 63-64, wherein the first C-WUS configuration indicates a first set of C-WUS resources for one or more first C-WUS monitoring occasions associated with the first network energy state, wherein the second C-WUS configuration indicates a second set of C-WUS resources for one or more second C-WUS monitoring occasions associated with the second network energy state, and wherein a first quantity C-WUS resources included in the first set of C-WUS resources is different than a second quantity of C-WUS resources included in the second set of C-WUS resources.

Aspect 66: The method of any of Aspects 40-65, wherein the C-WUS configuration information indicates the C-WUS triggering condition.

Aspect 67: The method of any of Aspects 40-66, wherein the C-WUS triggering condition is satisfied in connection with an uplink buffer size of the UE satisfying a threshold.

Aspect 68: The method of Aspect 67, wherein the threshold is at least one of: associated with a network energy state of the network node, indicated in the C-WUS configuration information or a downlink communication transmitted by the network node, associated with a priority of uplink traffic in an uplink buffer of the UE, or associated with at least one of a logical channel or a logical channel group.

Aspect 69: The method of any of Aspects 40-68, wherein the C-WUS triggering condition is satisfied in connection with an uplink latency associated with the UE being within a threshold of a packet delay budget.

Aspect 70: The method of any of Aspects 40-69, wherein the C-WUS triggering condition is satisfied in connection with a drop in reference signal received power (RSRP) measurements of downlink reference signals satisfying a threshold.

Aspect 71: The method of any of Aspects 40-70, wherein the C-WUS triggering condition is satisfied in connection with an energy level of the UE satisfying a threshold.

Aspect 72: The method of Aspect 71, wherein the energy level of the UE is associated with at least one of a charging rate profile of the UE, a discharging rate profile of the UE, or an energy state profile of the UE.

Aspect 73: The method of any of Aspects 40-72, wherein the C-WUS triggering condition is satisfied in connection with a discharging rate of the UE satisfying a threshold.

Aspect 74: The method of any of Aspects 40-73, wherein the C-WUS triggering condition is satisfied in connection with a mapping function or criterion associated with at least one of a charging rate profile of the UE, a discharging rate profile of the UE, or an energy state profile of the UE.

Aspect 75: The method of any of Aspects 40-74, wherein the one or more C-WUS monitoring occasions include a first set of C-WUS monitoring occasions associated with the C-WUS triggering condition being satisfied, and wherein the C-WUS configuration information indicates a null resource set associated with a second set of C-WUS monitoring occasions associated with the C-WUS triggering condition not being satisfied.

Aspect 76: The method of any of Aspects 40-75, further comprising: switching from a first network energy state to a second network energy state in connection with receiving the C-WUS.

Aspect 77: An apparatus for wireless communication at a device, comprising a processor; memory coupled with the processor; and instructions stored in the memory and executable by the processor to cause the apparatus to perform the method of one or more of Aspects 1-76.

Aspect 78: A device for wireless communication, comprising a memory and one or more processors coupled to the memory, the one or more processors configured to perform the method of one or more of Aspects 1-76.

Aspect 79: An apparatus for wireless communication, comprising at least one means for performing the method of one or more of Aspects 1-76.

Aspect 80: A non-transitory computer-readable medium storing code for wireless communication, the code comprising instructions executable by a processor to perform the method of one or more of Aspects 1-76.

Aspect 81: A non-transitory computer-readable medium storing a set of instructions for wireless communication, the set of instructions comprising one or more instructions that, when executed by one or more processors of a device, cause the device to perform the method of one or more of Aspects 1-76.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
    at least one memory; and
    at least one processor communicatively coupled with the at least one memory, the at least one processor operable to cause the UE to:
        receive, from a network node, cell wake-up signal (C-WUS) configuration information indicating respective C-WUS resources corresponding to each C-WUS monitoring occasion of a set of C-WUS monitoring occasions, the C-WUS configuration information indicating different C-WUS monitoring occasions corresponding to transmission of a C-WUS with information bits indicating different types of information; and
        transmit, to the network node and in connection with a C-WUS triggering condition being satisfied, the C-WUS via one or more C-WUS resources of the respective C-WUS resources corresponding to a C-WUS monitoring occasion of the set of C-WUS monitoring occasions, the one or more C-WUS resources being related to a C-WUS resource selection parameter.

2. The UE of claim 1,
    wherein the respective C-WUS resources corresponding to each C-WUS monitoring occasion of the set of C-WUS monitoring occasions are physical uplink control channel (PUCCH) resources.

3. The UE of claim 1,
    wherein the C-WUS configuration information indicates a cell-specific sequence for the C-WUS and one or more cyclic shifts, and wherein, to cause the UE to transmit the C-WUS, the at least one processor is operable to cause the UE to:
        transmit, via the one or more C-WUS resources, the cell-specific sequence with a cyclic shift of the one or more cyclic shifts.

4. The UE of claim 1,
    wherein the C-WUS configuration information is included in at least one of a radio resource control (RRC) message, a medium access control (MAC) control element (MAC-CE), or downlink control information (DCI).

5. The UE of claim 1,
    wherein the C-WUS configuration information is included in at least one of a master information block (MIB), a system information block (SIB) type 1 (SIB1), or another SIB.

6. The UE of claim 1,
wherein the at least one processor is further operable to cause the UE to:
select the one or more C-WUS resources in accordance with the C-WUS resource selection parameter.

7. The UE of claim 6,
wherein the respective C-WUS resources corresponding to each C-WUS monitoring occasion of the set of C-WUS monitoring occasions include one or more respective resource blocks (RBs) corresponding to each C-WUS monitoring occasion of the set of C-WUS monitoring occasions, and wherein, to cause the UE to select the one or more C-WUS resources, the at least one processor is operable to cause the UE to:
select at least one RB from the one or more respective RBs corresponding to the C-WUS monitoring occasion in accordance with the C-WUS resource selection parameter.

8. The UE of claim 1,
wherein the C-WUS configuration information indicates the C-WUS resource selection parameter to be used for selecting the one or more C-WUS resources.

9. The UE of claim 1,
wherein the C-WUS resource selection parameter is at least one of:
a scrambling identifier (ID), wherein the scrambling ID is indicated in the C-WUS configuration information,
a cell-specific sequence for the C-WUS, wherein the cell-specific sequence is indicated in the C-WUS configuration information,
a UE ID corresponding to the UE,
a UE group ID corresponding to a group of UEs including the UE,
a latest synchronization signal block (SSB) index or channel state information reference signal (CSI-RS) index indicated by the UE to the network node,
an SSB index selected by the UE,
an index of a reference signal related to a wake-up radio (WUR) of the UE,
a class or type of the UE,
a class or type of the WUR of the UE,
a class or type of a main radio (MR) of the UE, or
related to a network energy state of the network node.

10. The UE of claim 1, wherein, to cause the UE to transmit the C-WUS, the at least one processor is operable to cause the UE to:
multiplex the C-WUS with one or more information bits in the one or more C-WUS resources in accordance with the C-WUS monitoring occasion.

11. The UE of claim 10,
wherein the C-WUS configuration information indicates multiple cyclic shifts (CSs), and wherein, to cause the UE to multiplex the C-WUS with the one or more information bits, the at least one processor is operable to cause the UE to:
transmit, via the one or more C-WUS resources corresponding to the C-WUS monitoring occasion, the C-WUS and the one or more information bits using different respective CSs of the multiple CSs.

12. The UE of claim 10,
wherein the C-WUS configuration information indicates multiple uplink transmission power levels, and wherein, to cause the UE to multiplex the C-WUS with the one or more information bits, the at least one processor is operable to cause the UE to:
transmit, via the one or more C-WUS resources corresponding to the C-WUS monitoring occasion, the C-WUS and the one or more information bits using different respective uplink transmission power levels of the multiple uplink transmission power levels.

13. The UE of claim 10,
wherein the one or more C-WUS resources include multiple resource blocks (RBs) of the C-WUS monitoring occasion, and wherein, to cause the UE to multiplex the C-WUS with the one or more information bits, the at least one processor is operable to cause the UE to:
transmit the C-WUS and the one or more information bits via different respective RBs of the multiple RBs of the C-WUS monitoring occasion.

14. The UE of claim 10,
wherein the C-WUS configuration information indicates multiple cell-specific sequences, and wherein, to cause the UE to multiplex the C-WUS with the one or more information bits, the at least one processor is operable to cause the UE to:
transmit, via the one or more C-WUS resources corresponding to the C-WUS monitoring occasion, the C-WUS and the one or more information bits using different cell-specific sequences of the multiple cell-specific sequences.

15. The UE of claim 1,
wherein the set of C-WUS monitoring occasions include a first one or more C-WUS monitoring occasions related to transmission of the C-WUS without one or more additional information bits and a second one or more C-WUS monitoring occasions related to transmission of the C-WUS together with one or more additional information bits.

16. The UE of claim 1,
wherein the C-WUS configuration information indicates a first C-WUS configuration related to a first network energy state and a second C-WUS configuration related to a second network energy state.

17. The UE of claim 16,
wherein the first C-WUS configuration includes first C-WUS configuration information for a first one or more C-WUS monitoring occasions related to the first network energy state,
wherein the second C-WUS configuration includes second C-WUS configuration information for a second one or more C-WUS monitoring occasions related to the second network energy state, and
wherein the first one or more C-WUS monitoring occasions includes a first quantity of C-WUS monitoring occasions, the second one or more C-WUS monitoring occasions includes a second quantity of C-WUS monitoring occasions, and the first quantity is different than the second quantity.

18. The UE of claim 16,
wherein the first C-WUS configuration indicates a first set of C-WUS resources for one or more first C-WUS monitoring occasions related to the first network energy state, wherein the second C-WUS configuration indicates a second set of C-WUS resources for one or more second C-WUS monitoring occasions related to the second network energy state, and wherein a first quantity C-WUS resources included in the first set of C-WUS resources is different than a second quantity of C-WUS resources included in the second set of C-WUS resources.

19. The UE of claim 1,
wherein the C-WUS configuration information indicates the C-WUS triggering condition.

20. The UE of claim 1,
wherein the at least one processor is further operable to cause the UE to:
  detect that the C-WUS triggering condition is satisfied in connection with an uplink buffer size satisfying a threshold.

21. The UE of claim 20,
wherein the threshold is at least one of:
  related to a network energy state of the network node, indicated in the C-WUS configuration information or a downlink communication received from the network node,
  related to a priority of uplink traffic in an uplink buffer of the UE, or
  related to at least one of a logical channel or a logical channel group.

22. The UE of claim 1,
wherein the at least one processor is further operable to cause the UE to:
  detect that the C-WUS triggering condition is satisfied in connection with an uplink latency being within a threshold of a packet delay budget.

23. The UE of claim 1,
wherein the at least one processor is further operable to cause the UE to:
  detect that the C-WUS triggering condition is satisfied in connection with detecting a drop in reference signal received power (RSRP) measurements of downlink reference signals that satisfies a threshold.

24. The UE of claim 1,
wherein the at least one processor is further operable to cause the UE to:
  detect that the C-WUS triggering condition is satisfied in connection with an energy level of the UE satisfying a threshold.

25. The UE of claim 1,
wherein the at least one processor is further operable to cause the UE to:
  detect that the C-WUS triggering condition is satisfied in connection with a discharging rate of the UE satisfying a threshold.

26. The UE of claim 1,
wherein the at least one processor is further operable to cause the UE to:
  detect that the C-WUS triggering condition is satisfied in connection with a mapping function or criterion associated with at least one of a charging rate profile of the UE, a discharging rate profile of the UE, or an energy state profile of the UE.

27. The UE of claim 1,
wherein the at least one processor is further operable to cause the UE to:
  detect whether the C-WUS triggering condition is satisfied responsive to triggering of a scheduling request or buffer status report; and
  refrain from transmitting another C-WUS in another C-WUS monitoring occasion in connection with detecting that the C-WUS triggering condition is not satisfied.

28. A network node for wireless communication, comprising:
  at least one memory; and
  at least one processor communicatively coupled with the at least one memory, the at least one processor operable to cause the network node to:
    transmit cell wake-up signal (C-WUS) configuration information indicating respective C-WUS resources corresponding to each C-WUS monitoring occasion of a set of C-WUS monitoring occasions, the C-WUS configuration information indicating different C-WUS monitoring occasions corresponding to transmission of a C-WUS with information bits indicating different types of information; and
    receive, in connection with a C-WUS triggering condition being satisfied at a user equipment (UE), the C-WUS via one or more C-WUS resources of the respective C-WUS resources corresponding to a C-WUS monitoring occasion of the set of C-WUS monitoring occasions, the one or more C-WUS resources being related to a C-WUS resource selection parameter.

29. A method of wireless communication performed by a user equipment (UE), comprising:
  receiving, from a network node, cell wake-up signal (C-WUS) configuration information indicating respective C-WUS resources corresponding to each C-WUS monitoring occasion of a set of C-WUS monitoring occasions, the C-WUS configuration information indicating different C-WUS monitoring occasions corresponding to transmission of a C-WUS with information bits indicating different types of information; and
  transmitting, to the network node and in connection with a C-WUS triggering condition being satisfied, the C-WUS via one or more C-WUS resources of the respective C-WUS resources corresponding to a C-WUS monitoring occasion of the set of C-WUS monitoring occasions, the one or more C-WUS resources being related to a C-WUS resource selection parameter.

30. A method of wireless communication performed by a network node, comprising:
  transmitting cell wake-up signal (C-WUS) configuration information indicating respective C-WUS resources corresponding to each C-WUS monitoring occasion of a set of C-WUS monitoring occasions, the C-WUS configuration information indicating different C-WUS monitoring occasions corresponding to transmission of a C-WUS with information bits indicating different types of information; and
  receiving, in connection with a C-WUS triggering condition being satisfied at a user equipment (UE), the C-WUS via one or more C-WUS resources of the respective C-WUS resources corresponding to a C-WUS monitoring occasion of the set of C-WUS monitoring occasions, the one or more C-WUS resources being related to a C-WUS resource selection parameter.

* * * * *